(12) United States Patent  
Toshine

(10) Patent No.: US 8,539,147 B2  
(45) Date of Patent: Sep. 17, 2013

(54) APPARATUS AND METHOD FOR CONTROLLING STORAGE SYSTEM

(75) Inventor: Naoyoshi Toshine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 12/909,593

(22) Filed: Oct. 21, 2010

(65) Prior Publication Data

US 2011/0099346 A1    Apr. 28, 2011

(30) Foreign Application Priority Data

Oct. 27, 2009  (JP) ................................. 2009-246320

(51) Int. Cl.  
*G06F 12/00*  (2006.01)

(52) U.S. Cl.  
USPC ..... 711/112; 711/168; 711/117; 711/E12.016

(58) Field of Classification Search  
None  
See application file for complete search history.

(56) References Cited

U.S. PATENT DOCUMENTS

| | | | |
|---|---|---|---|
| 6,338,006 B1 * | 1/2002 | Jesionowski et al. ......... | 700/214 |
| 7,664,910 B2 | 2/2010 | Toshine | |
| 2006/0123207 A1 | 6/2006 | Yamamoto et al. | |
| 2008/0195826 A1 * | 8/2008 | Yamazaki et al. ............ | 711/161 |
| 2009/0043960 A1 * | 2/2009 | Toshine ........................ | 711/112 |

FOREIGN PATENT DOCUMENTS

| | | |
|---|---|---|
| JP | 11-272426 A | 10/1999 |
| JP | 2001-236706 A | 8/2001 |
| JP | 2002-7175 A | 1/2002 |
| JP | 3630408 B | 3/2005 |
| JP | 2005-165486 A | 6/2005 |
| JP | 2005-337660 A | 12/2005 |
| JP | 2006-79274 A | 3/2006 |
| JP | 2006-163454 A | 6/2006 |
| JP | 2006-172400 A | 6/2006 |
| JP | 2008-77423 A | 4/2008 |
| JP | 2009-43162 A | 2/2009 |

OTHER PUBLICATIONS

Japanese Office Action mailed Mar. 12, 2013 for corresponding Japanese Application No. 2009246320, with Partial English-language Translation.

* cited by examiner

*Primary Examiner* — Alford Kindred  
*Assistant Examiner* — Arvind Talukdar  
(74) *Attorney, Agent, or Firm* — Fujitsu Patent Center

(57) ABSTRACT

In a storage control apparatus, a first duplication control unit causes a logical volume in a disk array device to be copied to a secondary storage medium. A second duplication control unit causes the logical volume to be copied also to an export storage medium in a library device, in connection with the copying to the primary storage medium by the first duplication control unit, when export attributes indicate that the logical volume copied by the first duplication control unit is supposed to be exported. A medium ejection control unit causes the library device to eject the export storage medium, in response to an ejection request therefor.

10 Claims, 17 Drawing Sheets

FIG. 7

VOLUME MANAGEMENT TABLE
131

| PHYSICAL VOLUME ID | LOGICAL VOLUME ID | DATA STATUS | EXPORT STATUS |
|---|---|---|---|
| Tape0 | VolumeA0 | Dirty | Not Applied |
| Tape0 | VolumeA1 | Hit | Not Saved |
| Tape0 | VolumeA2 | Miss | Saved |
| ⋮ | ⋮ | ⋮ | ⋮ |
| ⋮ | ⋮ | ⋮ | ⋮ |

APPARATUS AND METHOD FOR CONTROLLING STORAGE SYSTEM

CROSS-REFERENCE TO RELATED APPLICATION

This application is based upon and claims the benefit of priority of the prior Japanese Patent Application No. 2009-246320, filed on Oct. 27, 2009, the entire contents of which are incorporated herein by reference.

FIELD

The embodiments discussed herein relate to a storage control apparatus and method for controlling operation of a hierarchical storage system.

BACKGROUND

Storage systems with a hierarchical structure are available in recent years, which incorporate high-speed storage media as a cache facility (or primary storage) together with less-expensive mass storage media as a back-end facility (or secondary storage). Hard disk drives (HDD) and solid state drives (SSD) are often used as primary storage, as are magnetic tape media as secondary storage. Such a hierarchical storage system is also called a virtual library system since it permits a host device to make virtual access to logical volumes in magnetic tape media via HDD or SSD.

Some virtual library systems employ a tape library device to store magnetic tape media containing produced logical volumes, in which a part of those logical volumes can be transported to or from a magnetic tape medium for the purpose of off-system storage. This act of transporting logical volumes is implemented by using, for example, the functions called "export" and "import." The export function is to copy a plurality of logical volumes in the virtual library system to a single magnetic tape medium and eject the magnetic tape medium containing the copy. The import function is to load the local tape library device with a magnetic tape medium exported from other virtual library system, and reconstruct the foreign logical volumes for use in the local system.

FIG. 17 illustrates an export operation performed in a virtual library system. As can be seen from FIG. 17, a virtual library system is formed from a management server 710, a disk array device 720, and a tape library device 730, for example. The management server 710 controls operation of the disk array device 720 and tape library device 730 according to data read and write requests from a host device (not illustrated). The disk array device 720 includes a plurality of HDDs which serve as the primary storage. Specifically, in the example of FIG. 17, the disk array device 720 includes four HDDs 721 to 724. The tape library device 730 reads data from and writes data to magnetic tape, which is used as a portable data storage medium. The magnetic tape media in the tape library device 730 are used mainly as secondary storage.

The management server 710 creates logical volumes in the disk array device 720. Upon request from a host device, the management server 710 records given write data in a specified logical volume in the disk array device 720. The management server 710 also copies logical volumes from the disk array device 720 to magnetic tape media placed in the tape library device 730 at specified times. This act of copying logical volumes from the disk array device 720 to magnetic tape media is called, for example, "migrate."

When a data read request is received from a host device, and if the requested data is part of a logical volume stored in the disk array device 720, the management server 710 reads the data out of the disk array device 720 and transmits it to the requesting host device. In the case where the logical volume containing requested data is absent in the disk array device 720, that logical volume is read out of a magnetic tape medium in the tape library device 730 and copied back to the disk array device 720. This act of copying a logical volume from a magnetic tape medium to the disk array device 720 is called, for example, "recall." The management server 710 then reads the requested data out of the copied logical volume in the disk array device 720 and transmits it to the requesting host device.

When a host device requests export of logical volumes, each specified local volume is read out of the corresponding magnetic tape media and copied to the disk array device 720 for temporary use. The copied logical volumes are further copied from the disk array device 720 to a magnetic tape medium assigned for external storage purposes. That is, the export operation begins with recalling logical volumes back to the disk array device 720 and then executes migration to the magnetic tape medium for each specified logical volume, while using HDDs in the disk array device 720 as its work area.

To export, for example, a plurality of logical volumes distributed in magnetic tape media 731 to 733 as depicted in FIG. 17, a recall operation is first executed with each specified logical volume. That is, those logical volumes are copied temporarily from the magnetic tape media 731 to 733 to an HDD 724 in the disk array device 720. The copied logical volumes in the HDD 724 is then subjected to a migration operation, which copies them to a magnetic tape medium 734 for external storage purposes. When all specified volumes are copied, the tape library device 730 ejects the magnetic tape medium 734, thus finishing the export operation.

For example, some existing library devices with a media eject function are designed to enable a host to efficiently utilize I/O slots by using functional addresses to conduct virtual cartridge moves from storage slots to I/O slots. Some hierarchical storage systems with a media eject function are designed to form a set of storage media, so as to manage the mounting of storage media on a library device, as well as their ejection therefrom, on a medium set basis. Logical volumes are also managed in association with those sets of storage media. For example, the following literature describes such conventional devices and systems:

Japanese Laid-open Patent Publication No. 2006-163454
Japanese Patent No. 3630408
Japanese Laid-open Patent Publication No. 2006-172400

Referring again to the export procedure illustrated in FIG. 17, each of the specified logical volumes is subjected at least to a migration operation, and some of those logical volumes may also have to undergone a recall operation before migration. For this reason, it takes a long time from reception of an export command of a host device to ejection of a magnetic tape medium containing all specified logical volumes for external storage.

SUMMARY

According to an aspect of the invention, there is provided a storage control apparatus for controlling operation of a hierarchical storage system which uses portable storage media in a library device as secondary storage. This storage control apparatus includes the following elements: a first duplication control unit that requests to copy a logical volume in a primary storage medium to a secondary storage medium, the primary storage medium serving as primary storage in the hierarchical storage system, the secondary storage medium being one of the portable storage media in the library device and serving as the secondary storage; a second duplication control unit that requests to copy the logical volume to an export storage medium, in connection with the copying by the first duplication control unit to the primary storage medium, when export attributes indicate that the logical volume copied by the first duplication control unit is supposed to be exported, the export storage medium being one of the portable storage media in the library device which is assigned for export operation; and a medium ejection control unit that causes the library device to eject the export storage medium, in response to an ejection request therefor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of data stored in a volume management table;

DESCRIPTION OF EMBODIMENTS

Figure 1:
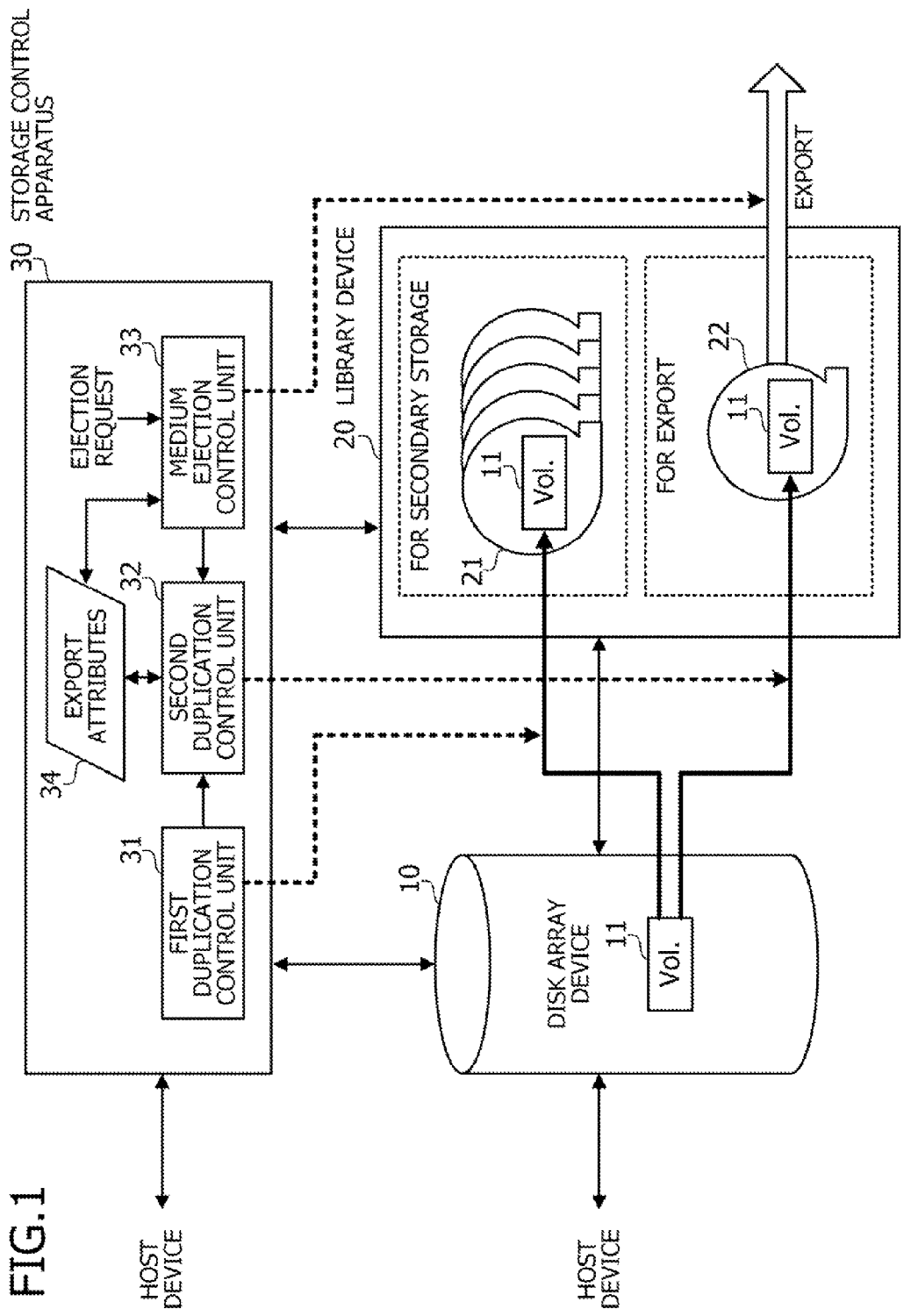
FIG. 1 illustrates a structure of a storage system according to a first embodiment.

Embodiments of the present invention will be described below with reference to the accompanying drawings, wherein like reference numerals refer to like elements throughout.

(a) First Embodiment

FIG. 1 illustrates a structure of a storage system according to a first embodiment. This storage system of FIG. 1 is formed from a disk array device 10, a library device 20, and a storage control apparatus 30. The disk array device 10 contains a plurality of HDDs. Those HDDs serve as primary storage under the control of the storage control apparatus 30. Other type of storage devices such as SSDs may also serve as primary storage if they have a faster access speed than secondary storage which is provided by the library device 20 as a plurality of portable storage media. Such primary storage media may be smaller in storage capacity than the secondary storage media. The library device 20 contains a plurality of portable storage media, such as magnetic tape, and reads data from and writes data to those portable storage media.

The storage control apparatus 30 controls data read and write operations in the disk array device 10 and library device 20. For example, the storage control apparatus 30 may be implemented as a computer. It is noted that the storage system may also be configured to connect the storage control apparatus 30 to the disk array device 10 and library device 20, not directly, but via some other intermediate control devices, so as to control their read and write operations.

The storage control apparatus 30 controls the primary storage (HDDs in the disk array device 10) and secondary storage (portable storage media in the library device 20) such that they will work together as a hierarchical storage system. For example, the storage control apparatus 30 causes the disk array device 10 to cache the data of logical volumes in portable storage media stored in the library device 20. The storage control apparatus 30 further enables host devices to make virtual access to logical volumes recorded in the portable storage media via the disk array device 10. Where appropriate, the following sections will use the term "secondary storage media" to refer to the portable storage media serving as secondary storage.

The storage system of FIG. 1 has the function of collecting one or more logical volumes on the secondary storage media in the library device 20 into a single portable storage medium, and ejecting the resulting portable storage medium out of the library device 20. This medium ejection function is also realized under the control of the storage control apparatus 30. Where appropriate, the following sections will use the term "export storage medium" to refer to a portable storage medium that is assigned for export of logical volumes and thus to be ejected out of the library device 20.

To implement the medium ejection function mentioned above, the storage control apparatus 30 includes first and second duplication control units 31 and 32 and a medium ejection control unit 33. Also the storage control apparatus 30 is configured to make access to export attributes 34, which are recorded in a local memory of the storage control apparatus 30 or in an external storage device coupled thereto. The functions of the first and second duplication control units 31 and 32 and medium ejection control unit 33 are realized by, for example, a central processing unit (CPU) in the storage control apparatus 30 which executes a software program coded therefor.

The first duplication control unit 31 offers fundamental control functions in a hierarchical storage system. That is, the first duplication control unit 31 causes the disk array device 10 and library device 20 to copy a logical volume 11 in the disk array device 10 to a secondary storage medium 21 in the library device 20. For example, the first duplication control unit 31 conducts this copying operation when a host device writes a new piece of data in the logical volume 11 stored in the disk array device 10.

The export attributes 34 provide information about each logical volume to indicate whether the logical volume is supposed to be exported to outside the library device 20. This information of the export attributes 34 may be rewritten upon request from a host device.

The second duplication control unit 32 consults the export attributes 34 to determine whether the logical volume 11 specified by the first duplication control unit 31 is among the logical volumes to be exported to outside the library device 20 (hereafter referred to as "export logical volumes"). In the case where the specified logical volume 11 is found to be an export logical volume, the second duplication control unit 32 initiates a copy operation of the logical volume 11 to an export storage medium 22 after it is copied to the secondary storage medium 21 by the first duplication control unit 31.

The medium ejection control unit 33 causes the library device 20 to eject the export storage medium 22 in response to an ejection request. The ejection request may be issued as, for example, an operation command from those who manage the storage system. Specifically, upon receipt of such an ejection request, the medium ejection control unit 33 consults the export attributes 34 to identify which logical volumes are specified as export logical volumes. If it is found that all the identified export logical volumes are recorded in the export storage medium 22, the medium ejection control unit 33 triggers ejection of the export storage medium 22 out of the library device 20.

The above-described processing of the first and second duplication control units 31 and 32 is executed on individual export logical volumes, so that those logical volumes are saved into the export storage medium 22 one by one. This feature makes it more likely that all specified export logical volumes are ready in the export storage medium 22 at the moment when the medium ejection control unit 33 receives an ejection request. When that is the case, the export storage medium 22 can be ejected in quite a short time after reception of the ejection request.

The export storage medium 22 may, however, lack some of the specified export logical volumes when an ejection request is received. In that case, the medium ejection control unit 33 requests the second duplication control unit 32 to copy the missing logical volumes to the export storage medium 22. In response, the second duplication control unit 32 copies the requested logical volumes from the disk array device 10 to the export storage medium 22 if they are present in the disk array device 10. If some export logical volume is absent in the disk array device 10, then the second duplication control unit 32 commands the library device 20 to mount a secondary storage medium containing that missing logical volume on a drive and creates a temporary copy of that logical volume in the disk array device 10. The second duplication control unit 32 then commands the library device 20 to copy the logical volume from the disk array device 10 to the export storage medium 22.

For the reasons stated above with respect to the processing of the first and second duplication control units 31 and 32, it is unlikely that none of the specified export logical volumes are present in the export storage medium 22 when an ejection request is received. Accordingly, the library device 20 can eject the export storage medium 22 in a shorter time after the reception of an ejection request.

The next section will discuss a more specific example of a hierarchical storage system, which uses magnetic disks as its primary storage and magnetic tape media as its secondary storage.

(b) Second Embodiment

Figure 2:
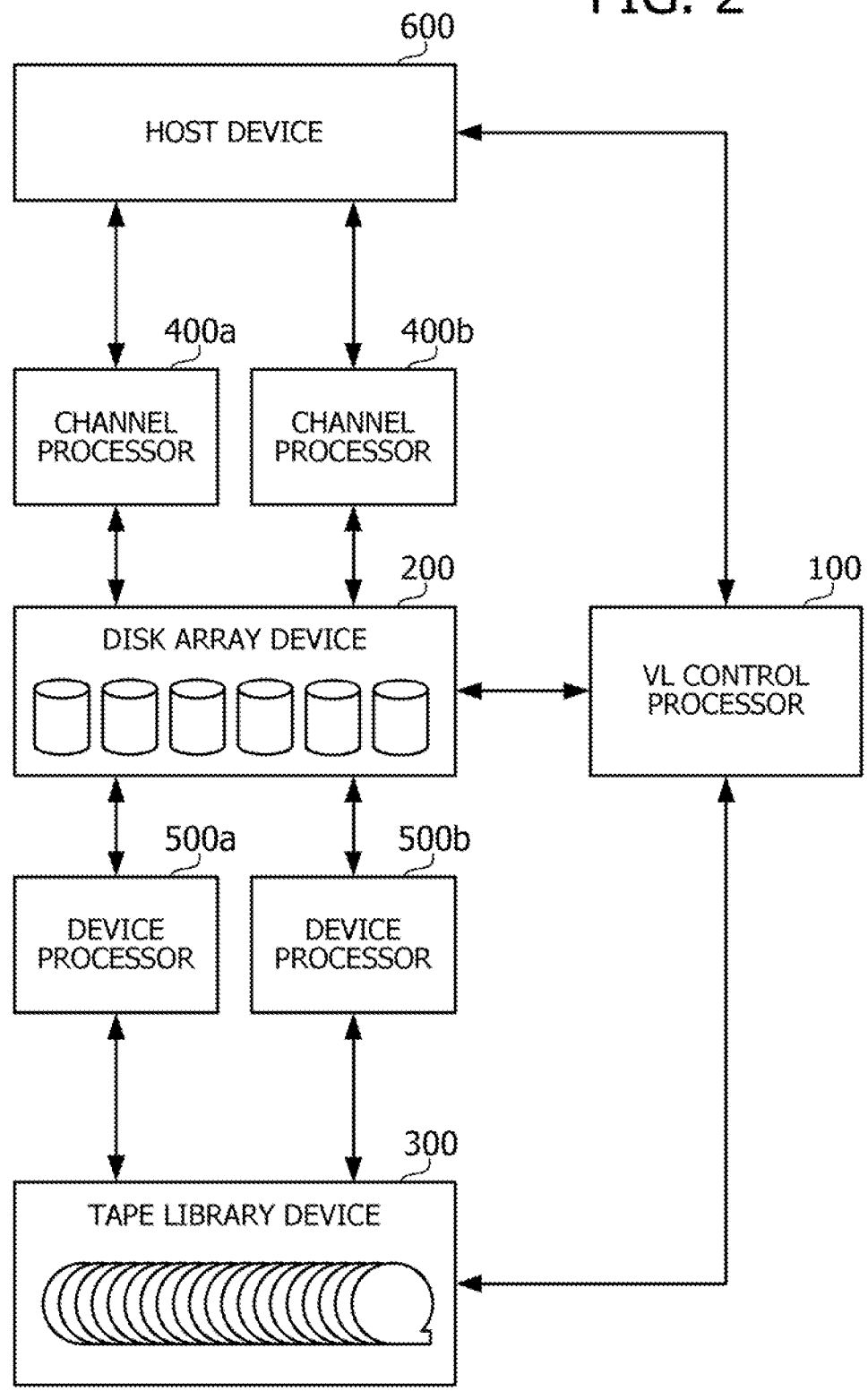
FIG. 2 is an overall block diagram of a storage system according to a second embodiment.

FIG. 2 is an overall block diagram of a storage system according to a second embodiment. This storage system of FIG. 2 is formed from a virtual library (VL) control processor 100, a disk array device 200, a tape library device 300, channel processors 400a and 400b, and device processors 500a and 500b. Connected to the VL control processors 100 and channel processors 400a and 400b is a host device 600.

The VL control processor 100 is connected to the host device 600, disk array device 200, and tape library device 300 via, for example, a local area network (LAN) with LAN switches (not illustrated) or the like. This LAN conveys control signals for controlling operation of the disk array device 200 and tape library device 300, besides transporting substantive data.

On the other hand, the host device 600 is connected to channel processors 400a and 400b via fiber-optic links with Fibre Channel switches (not illustrated) or the like. This also applies to the following connections: between the channel processors 400a and 400b and disk array device 200; between the disk array device 200 and device processors 500a and 500b; and between the device processors 500a and 500b and tape library device 300. Those fiber optic links transport read data and write data of the disk array device 200 and tape library device 300 at a transmission rate higher than the LAN linking them with the VL control processor 100.

The VL control processor 100 controls data transfer between the disk array device 200 and host device 600, as well as that between the disk array device 200 and tape library device 300. The VL control processor 100 makes the storage system of FIG. 2 work as a hierarchical virtual library system in which the disk array device 200 offers its magnetic disks as primary storage and the tape library device 300 offers its magnetic tape media as secondary storage. Here the virtual library system permits the host device 600 to make virtual access to a vast storage space available in the tape library device 300 via the disk array device 200.

The VL control processor 100 also realizes export and import functions by controlling the disk array device 200 and tape library device 300. The term "export function" refers to the function of copying specified logical volumes in the virtual library system to a single magnetic tape medium and ejecting that magnetic tape medium out of the tape library device 300. The logical volumes recorded in this ejected magnetic tape medium may be used in other virtual library systems. The term "import function" refers to the function of loading a given magnetic tape medium into the tape library device 300 and reconstructing logical volumes recorded in the magnetic tape medium so that they can be used in the virtual library system of FIG. 2.

The disk array device 200 contains a plurality of magnetic disk drives which function as primary storage in the virtual library system. Compared with the tape library device 300, the disk array device 200 is typically higher in access speed, but smaller in storage capacity.

The tape library device 300 contains a plurality of magnetic tape media, the whole or part of which functions as secondary storage in the virtual library system. Those magnetic tape media may each be provided in a dedicated enclosure, or a tape cartridge. The tape library device 300 has the function of ejecting a tape cartridge from its internal storage location to outside of the tape library device 300. The tape library device 300 also has the function of loading an inserted tape cartridge into an internal storage location.

The channel processors 400a and 400b provide interface functions for the host device 600 and disk array device 200 to send and receive data. Specifically, the channel processors 400a and 400b compress write data supplied from the host device 600 before writing it in the disk array device 200. They also decompress data read out of the disk array device 200 before transporting it to the host device 600. The device processors 500a and 500b provide interface functions for the disk array device 200 and tape library device 300 to send and receive data. The illustrated virtual library system offers an enhanced fault tolerance in its data transport paths by employing a plurality of channel processors 400a and 400b as well as a plurality of device processors 500a and 500b.

The host device 600 sends control signals to the VL control processor 100 in accordance with user inputs, thereby making access to the virtual library system. For example, to write data to the virtual library system, the host device 600 passes the write data to the disk array device 200 via either of the two channel processors 400a and 400b, besides requesting the VL control processor 100 to execute a data write operation. To read data out of the virtual library system, the host device 600 requests the VL control processor 100 to execute a data read operation and then receives read data from the disk array device 200 via either of the two channel processors 400a and 400b.

The host device 600 may also initiate an export or import operation by sending a request to the VL control processor 100 in accordance with user inputs. The host device 600 may similarly request the VL control processor 100 to set up the details of export operation.

The host device 600 described above may be provided in plurality. When that is the case, the virtual library system may be configured to accept simultaneous access from those multiple host devices 600. Also note that the VL control processor 100, channel processors 400a and 400b, and device processors 500a and 500b may be implemented as separate computers, for example. Those computers may be located in a single enclosure.

Figure 3:
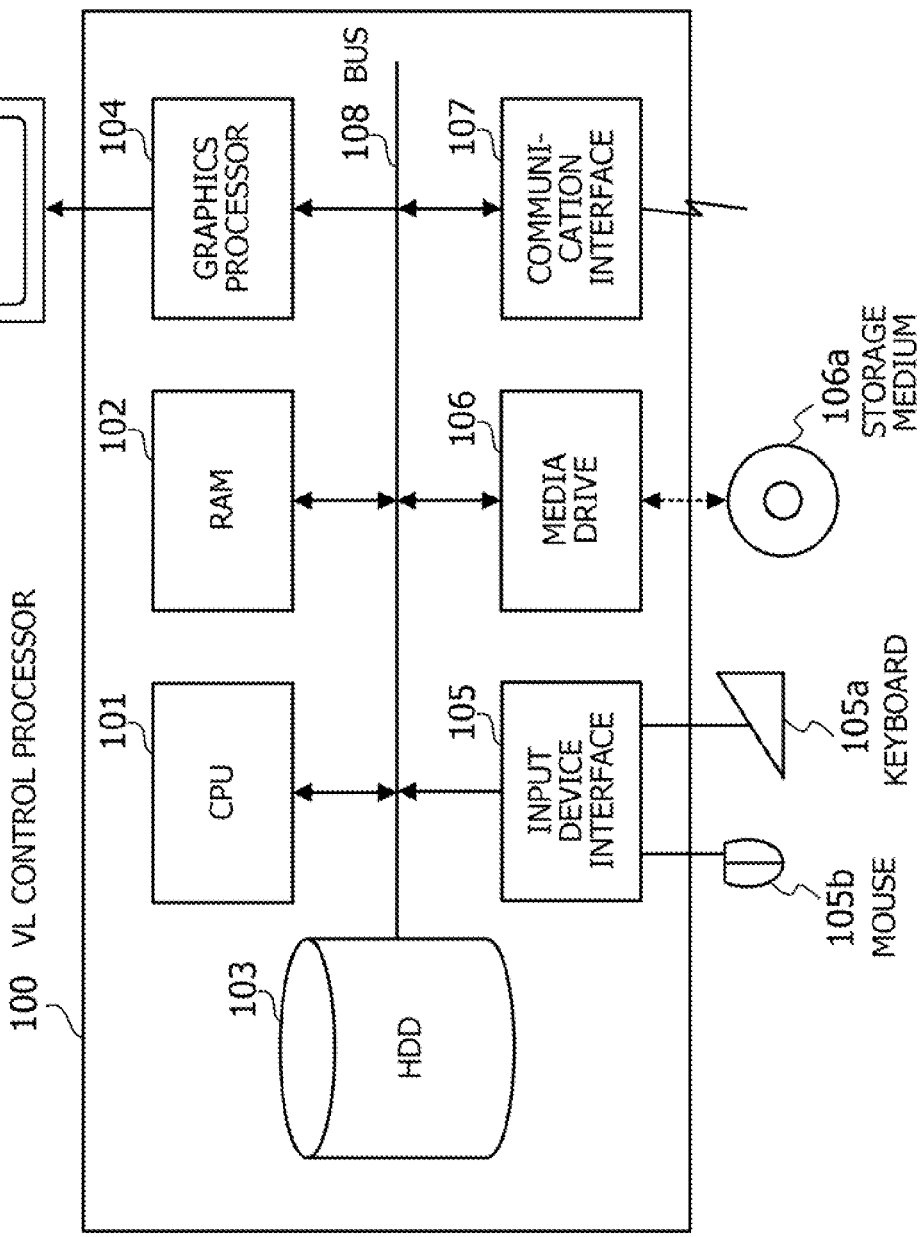
FIG. 3 illustrates an example hardware configuration of a VL control processor.

FIG. 3 illustrates an example hardware configuration of a VL control processor. For example, the VL control processor 100 is implemented as a computer illustrated in FIG. 3. This computer is formed from a CPU 101, a random access memory (RAM) 102, an HDD 103, a graphics processor 104, an input device interface 105, a media drive 106, and a communication interface 107. These components are connected to each other via a bus 108.

The CPU 101 centrally controls this computer in its entirety by executing various programs stored in the HDD 103. The RAM 102 serves as temporary storage for at least part of the programs that the CPU 101 executes, as well as for various data objects that the CPU 101 manipulates by executing the programs. The HDD 103 stores program files for the CPU 101, as well as various data files that the CPU 101 manipulates by executing the programs.

The graphics processor 104 is connected to, for example, a monitor 104a. The graphics processor 104 produces video images in accordance with commands from the CPU 101 and displays them on a screen of the monitor 104a. The input device interface 105 receives signals from, for example, a keyboard 105a and a mouse 105b coupled thereto. The received input signals are supplied to the CPU 101 via the bus 108.

The media drive 106 reads data out of a portable storage medium 106a and sends it to the CPU 101 via the bus 108. The portable storage medium 106a may be, for example, an optical disc. The communication interface 107 provides links to external devices, such as the disk array device 200, tape library device 300, and host device 600, via its connectors (not illustrated) so as to exchange data with those devices.

While FIG. 3 only illustrates the VL control processor 100, the same hardware configuration can also be applied to other computers including the channel processors 400a and 400b, device processors 500a and 500b, and host device 600.

Figure 4:
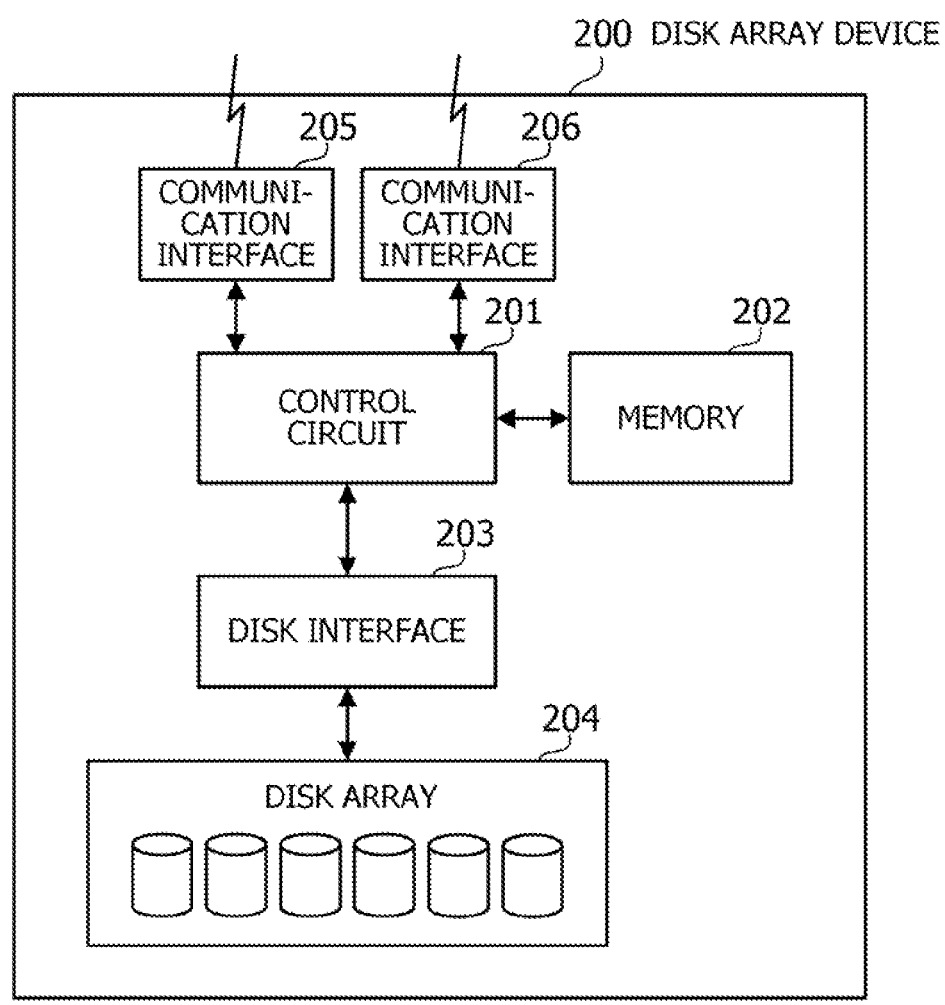
FIG. 4 illustrates an example hardware configuration of a disk array device.

FIG. 4 illustrates an example hardware configuration of a disk array device. The illustrated disk array device 200 includes a control circuit 201, a memory 202, a disk interface 203, a disk array 204, and communication interfaces 205 and 206.

The control circuit 201 centrally controls the disk array device 200 in its entirety. The memory 202 stores, for example, various data that the control circuit 201 uses to perform its processing operation. The disk interface 203 writes data to the disk array 204, and reads data from the disk array 204, in response to requests from the control circuit 201.

The disk array 204 is formed from a plurality of magnetic disks mounted in the form of an array. The communication interfaces 205 and 206 are connected to external devices via their respective connectors (not illustrated) so as to exchange data with those devices. For example, one communication interface 205 may be connected to the channel processors 400a and 400b via fiber optic links, and the other communication interface 206 is connected to the VL control processor 100 via LAN.

Figure 5:
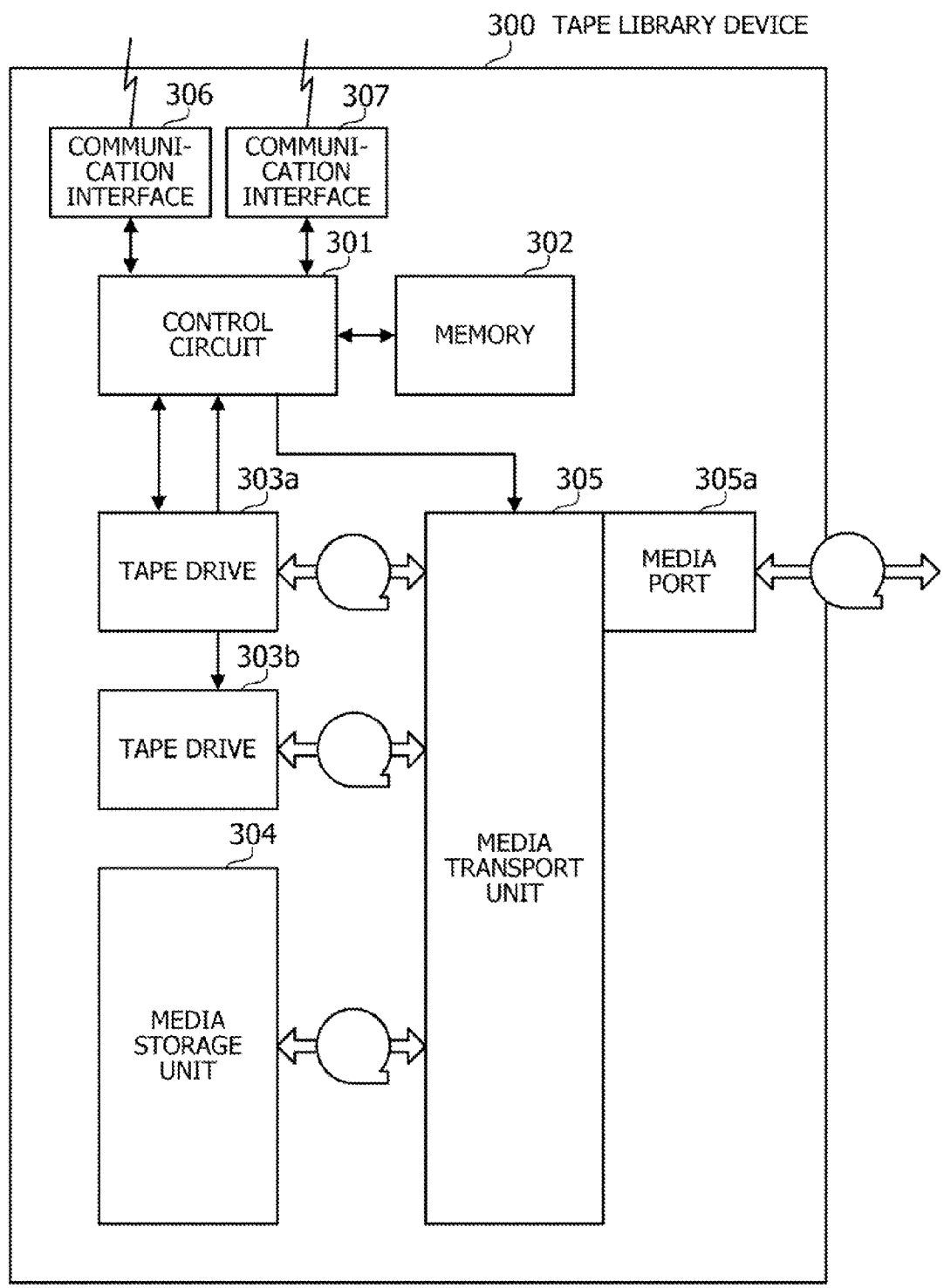
FIG. 5 illustrates an example hardware configuration of a tape library device.

FIG. 5 illustrates an example hardware configuration of a tape library device. The illustrated tape library device 300 includes a control circuit 301, a memory 302, tape drives 303a and 303b, a media storage unit 304, a media transport unit 305, and communication interfaces 306 and 307.

The control circuit 301 centrally controls the tape library device 300 in its entirety. The memory 302 stores, for example, various data that the control circuit 301 uses to perform its processing operation.

The tape drives 303a and 303b write data to magnetic tape media in the mounted tape cartridges, as well as reading data from those magnetic tape media, under the control of the control circuit 301. Each cartridge contains a single roll of magnetic tape. An integrated circuit (IC) memory chip is mounted on a surface of the tape cartridge. This IC memory chip has contactless communication capabilities to allow the tape drives 303a and 303b to write data to and read data from the IC memory in a non-contact fashion. For example, when some data is written in a magnetic tape medium, the IC memory chip on its cartridge is used to record the directory information of that data.

While FIG. 5 illustrates two tape drives, the tape library device 300 may contain three or more tape drives, or may contain only one tape drive. When it employs a plurality of tape drives, the tape library device 300 can support parallel data transmission and reception between those tape drives and the disk array device 200.

The media storage unit 304 stores a plurality of tape cartridges. Those tape cartridges in the media storage unit 304 are broadly classified into two groups, one for use as part of the virtual library system, and the other for export operation. In the following sections, the term "VL magnetic tape media" will be used to refer to magnetic tape media in the former group of tape cartridges. Similarly the term "export magnetic tape media" will be used in the following sections to refer to magnetic tape media in the latter group of tape cartridges. The VL control processor 100 determines which magnetic tape media to use for which purposes. Note that a magnetic tape medium that has been used for VL can be repurposed for export, or vice versa.

The media transport unit 305 transports a tape cartridge under the control of the control circuit 301. More specifically, the media transport unit 305 transports a tape cartridge from its storage location in the media storage unit 304 to either of the two tape drives 303a and 303b and mounts it on that drive. The media transport unit 305 also unmounts a tape cartridge from the tape drives 303a and 303b and transports it back to a storage location in the media storage unit 304. The media transport unit 305 has a media port 305a, through which a tape cartridge carried from the tape drive 303a and 303b or media storage unit 304 is ejected out of the tape library device 300. The media port 305a also accepts a tape cartridge inserted from the outside, which is then transported by the media transport unit 305 to the tape drives 303a and 303b or media storage unit 304.

The communication interfaces 306 and 307 are connected to external devices via their respective connectors (not illustrated) so as to exchange data with those external devices. For example, one communication interface 306 may be used to connect to device processors 500a and 500b via fiber optic links, and the other communication interface 307 may be used to connect to the VL control processor 100 via LAN.

Figure 6:
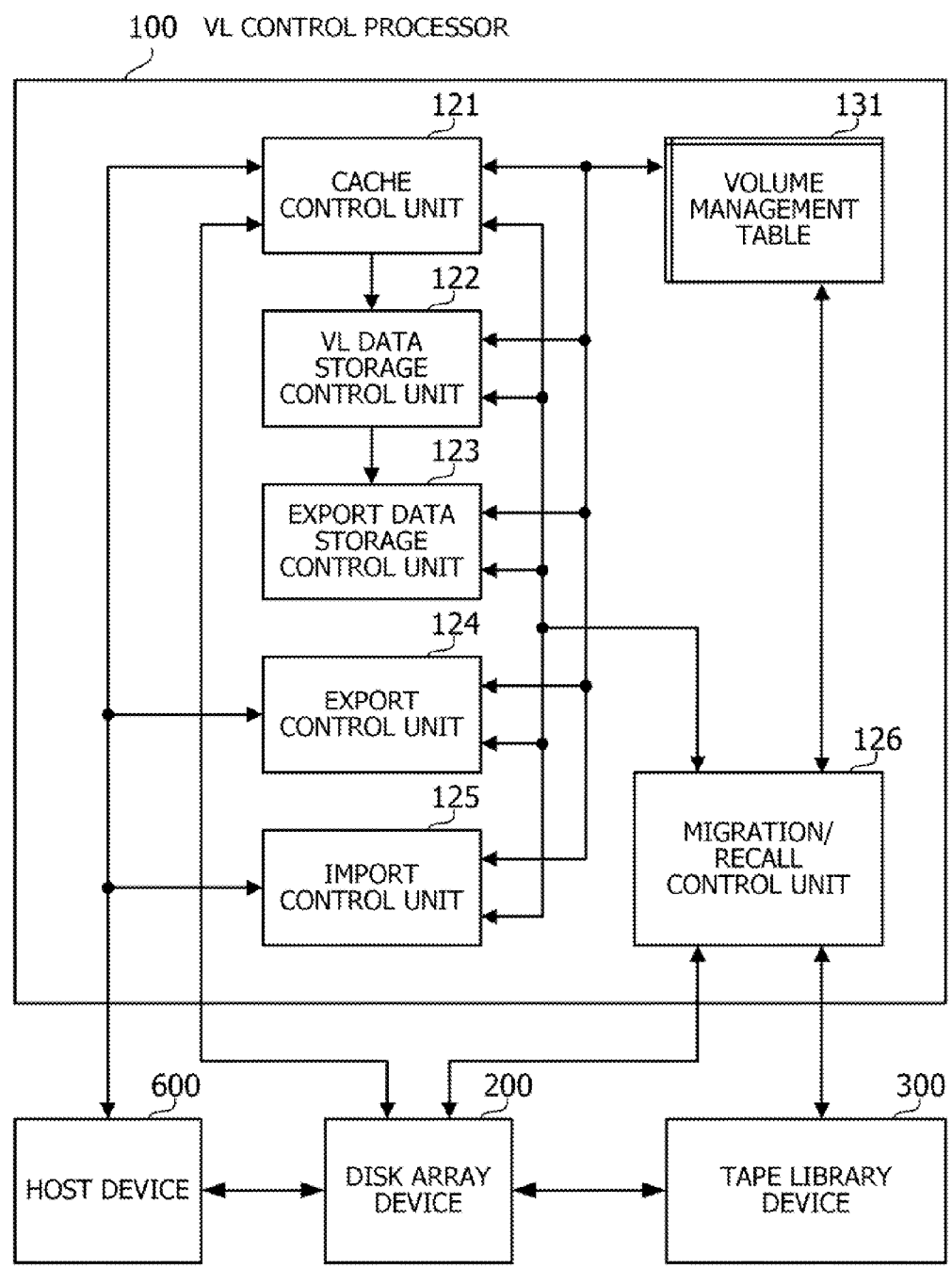
FIG. 6 is a block diagram illustrating functions that a VL control processor offers.

FIG. 6 is a block diagram illustrating functions that a VL control processor offers. The illustrated VL control processor 100 includes a cache control unit 121, a VL data storage control unit 122, an export data storage control unit 123, an export control unit 124, an import control unit 125, and a migration/recall control unit 126. These functional blocks are realized by the CPU 101 in the VL control processor 100 which executes specific programs stored in the HDD 103. The VL control processor 100 also has a volume management table 131 in its local storage device (e.g., HDD 103) to store information used for management of logical volumes.

The cache control unit 121 controls data read operations from the disk array device 200 to the host device 600, as well as data write operations from the host device 600 to the disk array device 200, according to access requests that the host device 600 makes to the virtual library system. When, for example, a data write request is received from the host device 600, the cache control unit 121 commands the disk array device 200 to record given write data in a specified logical volume. Then the cache control unit 121 requests the VL data storage control unit 122 to copy the logical volume, now containing the write data, to a VL magnetic tape medium in the tape library device 300.

When a data read request is received from the host device 600, the cache control unit 121 consults the volume management table 131 to determine whether the logical volume containing requested data is present in the disk array device 200. Suppose, for example, the host device 600 has specified data in a logical volume named "Vol. 01" in its data read request. In the case where the disk array device 200 has this logical volume "Vol. 01" in its storage space, the cache control unit 121 requests the disk array device 200 to read out the requested data from the logical volume "Vol. 01" and send it to the host device 600. On the other hand, in the case where the disk array device 200 does not contain this logical volume "Vol. 01" in its storage space, the cache control unit 121 requests the migration/recall control unit 126 to copy the logical volume "Vol. 01" containing the requested read data from its corresponding magnetic tape medium in the tape library device 300 to the disk array device 200. The cache control unit 121 then requests the disk array device 200 to read the data out of the copied logical volume "Vol. 01" and send it to the host device 600.

The VL data storage control unit 122 requests the migration/recall control unit 126 to copy logical volumes recorded in the disk array device 200 to a VL magnetic tape medium in the tape library device 300, in response to a request from the cache control unit 121. The VL data storage control unit 122 further requests the export data storage control unit 123 to execute a data storage operation on the same set of export logical volumes.

The export data storage control unit 123 requests the migration/recall control unit 126 to copy logical volumes recorded in the disk array device 200 to an export magnetic tape medium in the tape library device 300, in response to a request from the VL data storage control unit 122.

The export control unit 124 controls export operations according to a request from the host device 600. More specifically, the export control unit 124 consults the volume management table 131 to confirm that every specified export logical volume is stored in the export magnetic tape medium. After the confirmation, the export control unit 124 requests the migration/recall control unit 126 to eject the tape cartridge containing the export magnetic tape medium out of the media port 305a.

The import control unit 125 controls import operations according to a request from the host device 600. More specifically, the import control unit 125 requests the migration/recall control unit 126 to copy logical volumes from a tape cartridge loaded in the tape library device 300 to the disk array device 200.

The migration/recall control unit 126 controls migration and recall operations of logical volumes between the disk array device 200 and tape library device 300, as well as eject and load operations of a tape cartridge in the tape library device 300. Migration refers to a process of copying logical volumes in the disk array device 200 to a magnetic tape medium in the tape library device 300. Recall refers to a process of copying logical volumes recorded in a magnetic tape medium in the tape library device 300 back to the disk array device 200. The migration/recall control unit 126 may receive execution requests for such migration and recall operations from the cache control unit 121, VL data storage control unit 122, export data storage control unit 123, export control unit 124, and import control unit 125. Basically, the migration/recall control unit 126 executes those requests in the order that they are received. One exception is when it receives a recall request from the cache control unit 121, export control unit 124, or import control unit 125. The migration/recall control unit 126 executes such recall requests in preference to others, because those requests derive from the host device 600 and thus have to be executed as quickly as possible. As a result of this prioritization, some migration operations (e.g., when saving data in a VL magnetic tape medium or export magnetic tape medium) may be executed as a background process. The migration/recall control unit 126 may change the order of execution when a specific request is made for a change in the priority of processing.

The migration/recall control unit 126 may be configured to manage each requested operation as a queued job. For example, each requested job is put into a queue as it is received, and the migration/recall control unit 126 dequeues and executes those jobs one by one. The migration/recall control unit 126 may also be configured to rearrange the order of pending jobs in the queue, as necessary, according to some given priority rules (e.g., execute recall processing in preference to others). With these features, the requested operations are executed in the order of their priorities. A specific priority rule gives different priorities to different operations. To recognize what rule to apply, the migration/recall control unit 126 may consults, for example, a table describing priority of each kind of operation.

FIG. 7 illustrates an example of data stored in a volume management table. The illustrated volume management table 131 contains entries each associating a specific physical volume ID with a specific logical volume ID. Here the physical volume IDs identify individual VL magnetic tape media in the tape library device 300, and the logical volume IDs identify individual logical volumes. In the example of FIG. 7, a plurality of logical volumes can be recorded in a single VL magnetic tape medium.

The entries of this volume management table 131 further associate each logical volume with two pieces of status information, named "data status" and "export status." The data status field of a table entry indicates the condition of a logical volume in the disk array device 200 and a logical volume in the tape library device 300 which are identified by the same logical volume ID. Data status takes a value of "Dirty" or "Hit" or "Miss," for example.

"Dirty" means that the logical volume in the disk array device 200 stores the latest data whereas its counterpart in the tape library device 300 has not been updated with that data. "Hit" means that the logical volume in the disk array device 200 and its counterpart in the tape library device 300 store the same data. For example, the cache control unit 121 gives a "Dirty" data status to a logical volume, in its entry of the volume management table 131, when some data is recorded in the logical volume in the disk array device 200 in response to a request from the host device 600. The logical volume is copied later to a VL magnetic tape medium in the tape library device 300, which causes the VL data storage control unit 122 to change the corresponding data status in the volume management table 131 from "Dirty" to "Hit."

On the other hand, "Miss" means that the logical volume in question is recorded only in the tape library device 300 whereas the disk array device 200 has no records of that volume. For example, when the vacant space in the disk array device 200 falls below a certain level, the cache control unit 121 requests the disk array device 200 to find and purge the least recently used logical volumes by checking their last access times. When such logical volumes are purged, the cache control unit 121 gives a "Miss" data status to their corresponding entries in the volume management table 131.

The export status field indicates the condition of a logical volume with respect to export operations by using a value of "Not Applied" or "Not Saved" or "Saved." "Not Applied" means that the corresponding logical volume is not among those to be exported, or in other words, it is a non-export logical volume. "Not Saved" means that the corresponding logical volume is supposed to be exported, but not yet saved in the export magnetic tape medium. "Saved" means that the corresponding logical volume is supposed to be exported and has actually been saved in the export magnetic tape medium.

Figure 8:
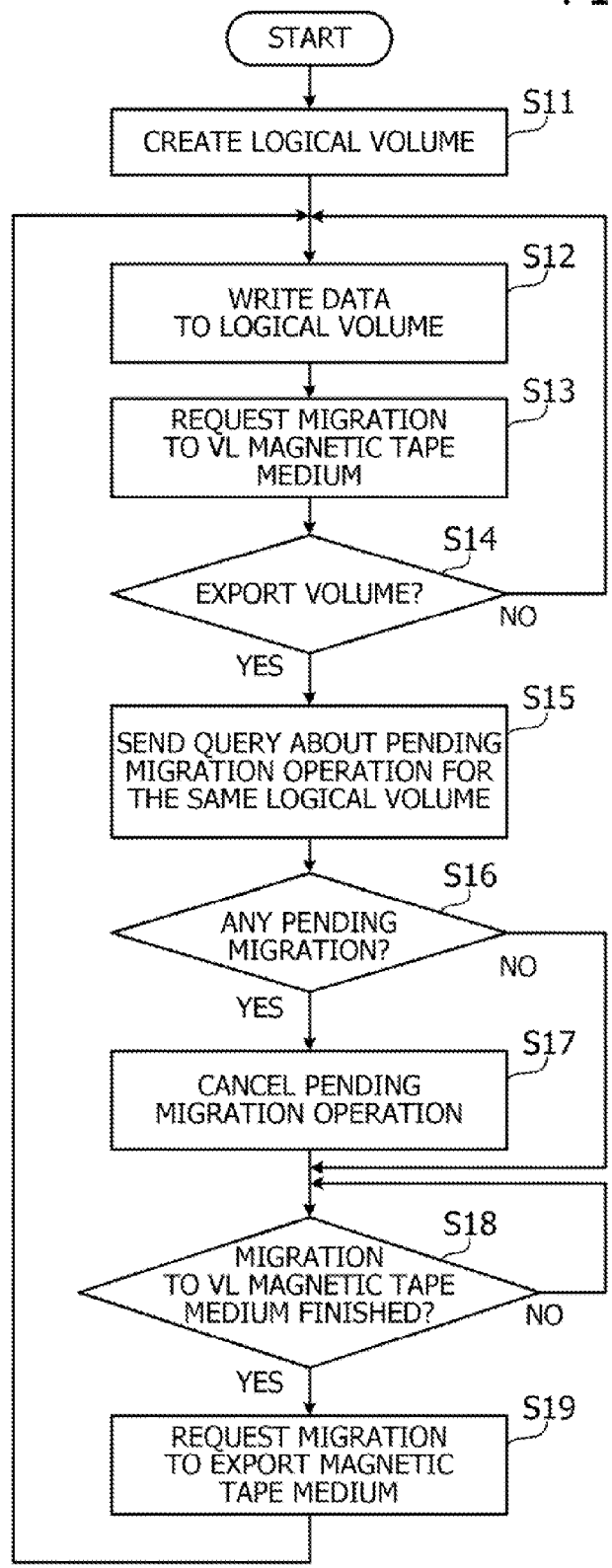
FIG. 8 is a flowchart illustrating a process of writing data in a logical volume.

The following sections will now describe various processing operations performed by the storage system of the present embodiment, with reference to several flowcharts. FIG. 8 is a flowchart illustrating a process of writing data in a logical volume. The process illustrated in FIG. 8 assumes that the data write operation acts on a single logical volume.

(Step S11) The cache control unit 121 creates a new logical volume in the disk array device 200 in response to, for example, a request from the host device 600. The cache control unit 121 also creates a new entry, with a new logical volume ID, in the volume management table 131.

In the case where the host device 600 requests that the new logical volume be exported, the cache control unit 121 gives a value of "Note Saved" to the export status field of its corresponding entry in the volume management table 131. In the case where there is no such request, the cache control unit 121 gives a value of "Not Applied" to the export status field to indicate that the volume is a non-export logical volume. For example, the cache control unit 121 may be configured to create a new entry with a default value of "Not Applied" for the export status field and change it later to "Not Saved" upon receipt of a request from the host device 600 for a change of the export status.

This S11 may execute an attribute changing operation in addition to the above processing, so as to enroll an existing logical volume as one of the export logical volumes, in response to, for example, a request from the host device 600. In this case, the cache control unit 121 changes the export status field of the corresponding entry in the volume management table 131, from "Not Applied" to "Not Saved," upon request from the host device 600.

(Step S12) Upon receipt of the data write request from the host device 600, the cache control unit 121 manipulates the disk array device 200 so as to write the data supplied from the host device 600 in the logical volume that is created or subjected to an attribute changing operation at S11. The cache control unit 121 also gives a "Dirty" data status to the corresponding logical volume in the volume management table 131.

(Step S13) The cache control unit 121 requests the VL data storage control unit 122 to copy the logical volume that has gained new data at S12, from the disk array device 200 to a VL magnetic tape medium in the tape library device 300. Upon request, the VL data storage control unit 122 requests the migration/recall control unit 126 to execute a migration operation for the specified logical volume on the disk array device 200.

As mentioned before, the migration/recall control unit 126 executes requested processing operations in the order that they are received. After finishing the migration operation requested at S13, the migration/recall control unit 126 notifies the VL data storage control unit 122 of the completion, as well as of a physical volume ID indicating in which magnetic tape medium the logical volume has been recorded. The VL data storage control unit 122 receives this physical volume ID and writes it in the corresponding entry of the volume management table 131, together with its "Hit" data status.

Note that the above processing of S13 may be executed after the data write operation on a logical volume at S12 is repeated multiple times.

(Step S14) Based on the export status in the volume management table 131, the VL data storage control unit 122 determines whether the specified logical volume is an export logical volume. More specifically, when the export status indicates "Not Saved" or "Saved," the VL data storage control unit 122 then executes S15 since it means that the logical volume in question is to be exported. Further, in the case where the volume management table 131 indicates "Saved" in the corresponding export status field, the VL data storage control unit 122 changes that field value to "Not Saved" so as to reflect the fact that new data has been written in the logical volume at S12. On the other hand, if the specified logical volume is a non-export logical volume, then the process returns to S12, where the cache control unit 121 waits for a new data write operation to logical volumes.

(Step S15) The VL data storage control unit 122 requests the export data storage control unit 123 to copy the logical volume containing data written at S12 to an export magnetic tape medium in the tape library device 300. The export data storage control unit 123 then sends a query to the migration/recall control unit 126 about the presence of pending migration operations for the same logical volume which are requested by the export data storage control unit 123 but have not yet been executed.

(Step S16) The migration/recall control unit 126 seeks pending migration operations by searching, for example, the aforementioned queue of pending jobs and sends the result back to the export data storage control unit 123. When a relevant pending migration operation is found, S17 is to be executed. When no such pending process is found, S18 is to be executed.

(Step S17) The export data storage control unit 123 requests the migration/recall control unit 126 to cancel the pending migration operation found at S16. In response, the migration/recall control unit 126 removes the corresponding job from the queue, thereby canceling the requested migration operation.

(Step S18) The export data storage control unit 123 checks the progress of the migration to a VL magnetic tape medium that it requested at S13. This check is performed on the basis of, for example, notification from the migration/recall control unit 126. When it is notified that the migration operation is finished, S19 is then executed.

(Step S19) The export data storage control unit 123 requests the migration/recall control unit 126 to execute a migration operation to copy the logical volume containing data written at S12 to an export magnetic tape medium in the tape library device 300. In connection with this requested migration operation, the export data storage control unit 123 also requests the migration/recall control unit 126 to lower the priority of that migration operation, relative to migration operations to VL magnetic tape media. Accordingly, if there are any other pending migration operations, and if they are to copy other logical volumes to VL management tape media, the migration/recall control unit 126 will execute those migration operations in preference to the above migration operation to the export magnetic tape medium.

The export magnetic tape medium specified as the destination of migration may not be mounted on a tape drive at the moment when the migration operation is requested. In that case, the tape library device 300 loads and mounts the export magnetic tape medium on a tape drive under the control of the migration/recall control unit 126.

The process of FIG. 8 then returns to S12, thus allowing the cache control unit 121 to wait for a new data write operation to the logical volume. The migration/recall control unit 126, on the other hand, executes the migration operation requested at S19 and notifies the export data storage control unit 123 of its completion. In response to this notification, the export data storage control unit 123 assigns a value of "Saved" to the corresponding export status field in the volume management table 131.

According to the above processing steps of FIG. 8, each time a logical volume on the disk array device 200 is copied to a VL magnetic tape medium, the migration/recall control unit 126 is requested to copy the same logical volume to an export magnetic tape medium in the tape library device 300. When an export operation for logical volumes is requested later, it is likely that many of the specified export logical volumes are already recorded in the export magnetic tape medium as a result of the above processing of FIG. 8. The export magnetic tape media can therefore be ejected in a shorter time after reception of the export request.

The above-described migration of logical volumes to an export magnetic tape medium is given a lower priority than other operations in the virtual library system and thus executed as a background process, without affecting too much the performance of the virtual library system.

Figure 9:
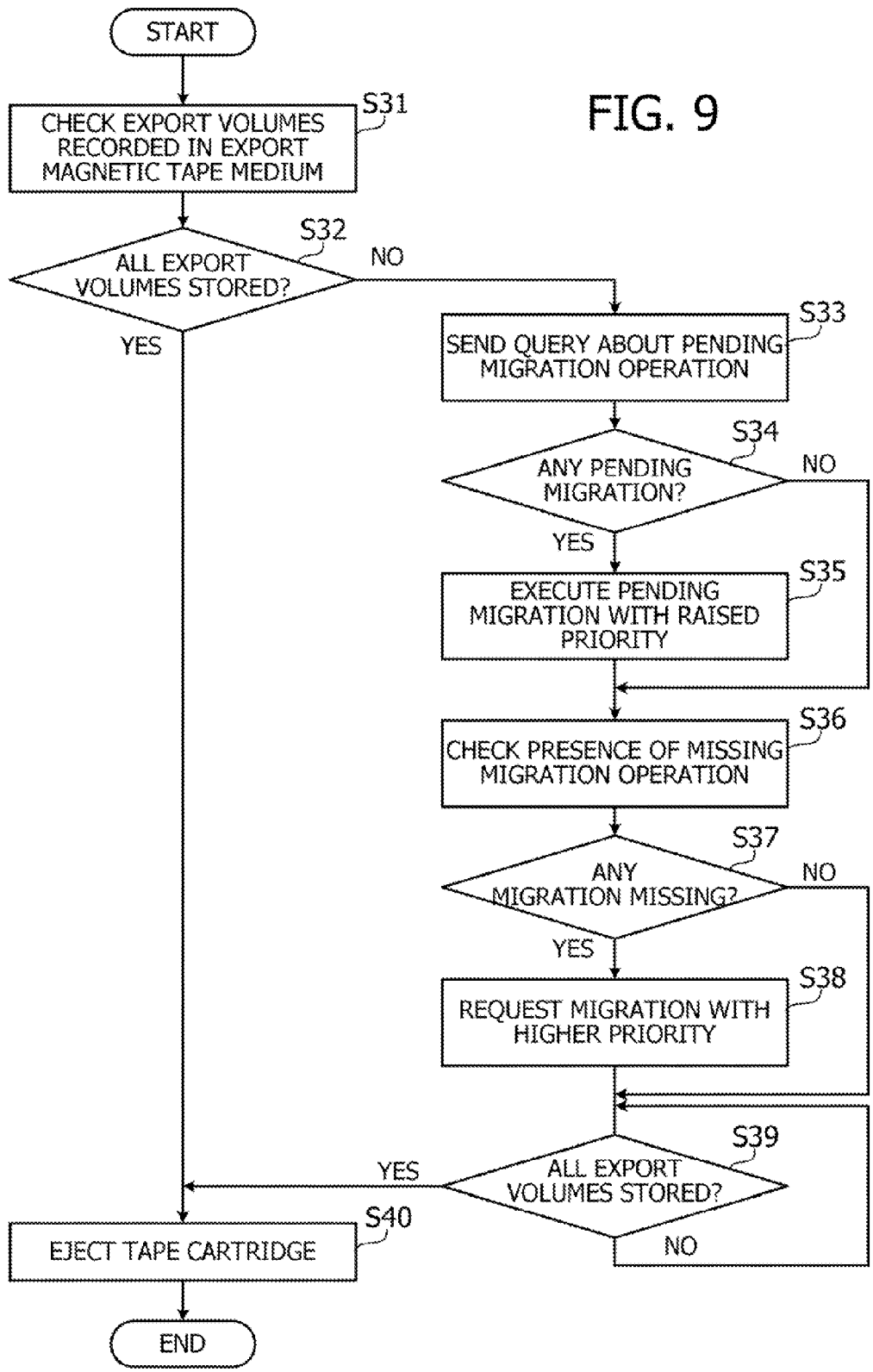
FIG. 9 is a flowchart of a process executed when export is requested.

FIG. 9 is a flowchart of a process executed when export is requested. This export operation of FIG. 9 is executed by the VL control processor 100 when so requested by the host device 600.

(Step S31) With reference to the export status field of the volume management table 131, the export control unit 124 determines whether the export magnetic tape medium contains all the specified export logical volumes.

(Step S32) When all the specified export logical volumes are contained, S40 is to be executed. When some export logical volumes are missing in the export magnetic tape medium, S33 is to be executed.

(Step S33) The export control unit 124 then sends a query to the migration/recall control unit 126 about the presence of pending migration operations for the export magnetic tape medium which are requested by the export data storage control unit 123 but have not yet been executed.

(Step S34) The migration/recall control unit 126 seeks pending migration operations by searching, for example, the aforementioned queue of pending jobs and sends the result back to the export control unit 124. When relevant pending migration operations are found, S35 is to be executed. When no such pending operations are found, S36 is to be executed.

(Step S35) The export control unit 124 requests the migration/recall control unit 126 to raise the priority of the pending migration operations found at S34. The migration/recall control unit 126 thus executes that pending migration operations in preference to others. The priority of those migration operations is, however, lower than recall operations requested by the cache control unit 121, export control unit 124, or import control unit 125.

At this S35, the export control unit 124 may request the migration/recall control unit 126 to execute a recall operation to copy a logical volume from its VL magnetic tape medium to the disk array device 200 in the case where the volume management table 131 indicates the "Miss" data status in the entry corresponding to that logical volume. The export control unit 124 then requests the migration/recall control unit 126 to execute a migration operation to copy the recalled logical volume from the disk array device 200 to the export magnetic tape medium. In this way, export logical volumes absent in the disk array device 200 are reloaded into the disk array device 200 before they are copied to the export magnetic tape medium.

(Step S36) Some of the export logical volumes that needs migration to the export magnetic tape medium may not even be requested to the migration/recall control unit 126. The export control unit 124 checks whether there are such missing migration operations. For example, the export control unit 124 checks each logical volume marked as being "Not Saved" in its export status field of the volume management table 131 to find those not included in the pending migration operations found by the migration/recall control unit 126 at S34.

(Step S37) When missing migration operations are found, S38 is to be executed. When there are no missing migration operations, S39 is to be executed.

(Step S38) The export control unit 124 requests the migration/recall control unit 126 to execute the migration operations found to be missing at S36. As in S35, the export control unit 124 may request the migration/recall control unit 126 to execute a recall operation to copy a logical volume from its VL magnetic tape medium to the disk array device 200 in the case where the volume management table 131 indicates a "Miss" data status in the entry corresponding to that logical volume. The export control unit 124 then requests the migration/recall control unit 126 to execute a migration operation to copy the recalled logical volume from the disk array device 200 to the export magnetic tape medium.

The migration/recall control unit 126 executes the above recall and migration operations requested at S38 with a higher execution priority over other pending processes, in accordance with the request from the export control unit 124. The priority of such recall and migration operations is, however, lower than recall operations requested by the cache control unit 121, export control unit 124, or import control unit 125.

(Step S39) The migration/recall control unit 126 informs the export control unit 124 of completion of each pending migration operation. Based on this information, the export control unit 124 determines whether all export logical volumes have been stored in the export magnetic tape medium. Also in response to the completion of each migration operation requested at S35 and S38, the export control unit 124 gives a value of "Saved" to the export status field of its corresponding logical volume in the volume management table 131. When it is determined that all the export logical volumes have been stored in the export magnetic tape medium, S40 is to be executed.

(Step S40) The export control unit 124 requests the migration/recall control unit 126 to eject the tape cartridge containing the export magnetic tape medium out of the tape library device 300. Alternatively, this ejection request may be sent directly to the tape library device 300.

According to the above processing steps of FIG. 9, a copying operation to the export magnetic tape medium is performed only for the export logical volumes not present in that medium when export is requested. As discussed in FIG. 8, the process of copying logical volumes to an export magnetic tape medium runs in background each time a logical volume is copied from the disk array device 200 from to a VL magnetic tape medium. For this reason, it is unlikely that there is a missing export logical volume in the export magnetic tape medium when export is requested. The present embodiment thus makes it possible to eject the tape cartridge out of the tape library device 300 in a shorter time when export is requested.

It is noted that the tape library device 300 records data on magnetic tape, not by overwriting it on the existing records, but by appending it to the existing records, so as to finish the recording operation in a shorter time. This applies also to the migration operations copying log volumes to an export magnetic tape medium. That is, the data of export logical volumes is appended to existing records on the export magnetic tape medium. This means that the export magnetic tape medium may contain multiple copies of the same logical volume, in the case where, for example, that a migration operation has been executed repetitively on that logical volume at short time intervals. While all those copies have the same volume ID, only the latest copy of the logical volume is regarded as a valid volume, whereas the others are obsolete.

The conventional export operation begins migration of export logical volumes upon receipt of an export request. Accordingly, the ejected magnetic tape medium only contains the latest version of logical volumes. In contrast, the magnetic tape medium produced by the present embodiment may contain obsolete logical volumes. The present embodiment is therefore configured to disregard such obsolete log volumes, if any, when importing data from a magnetic tape medium, as will be described below with reference to FIG. 10.

Figure 10:
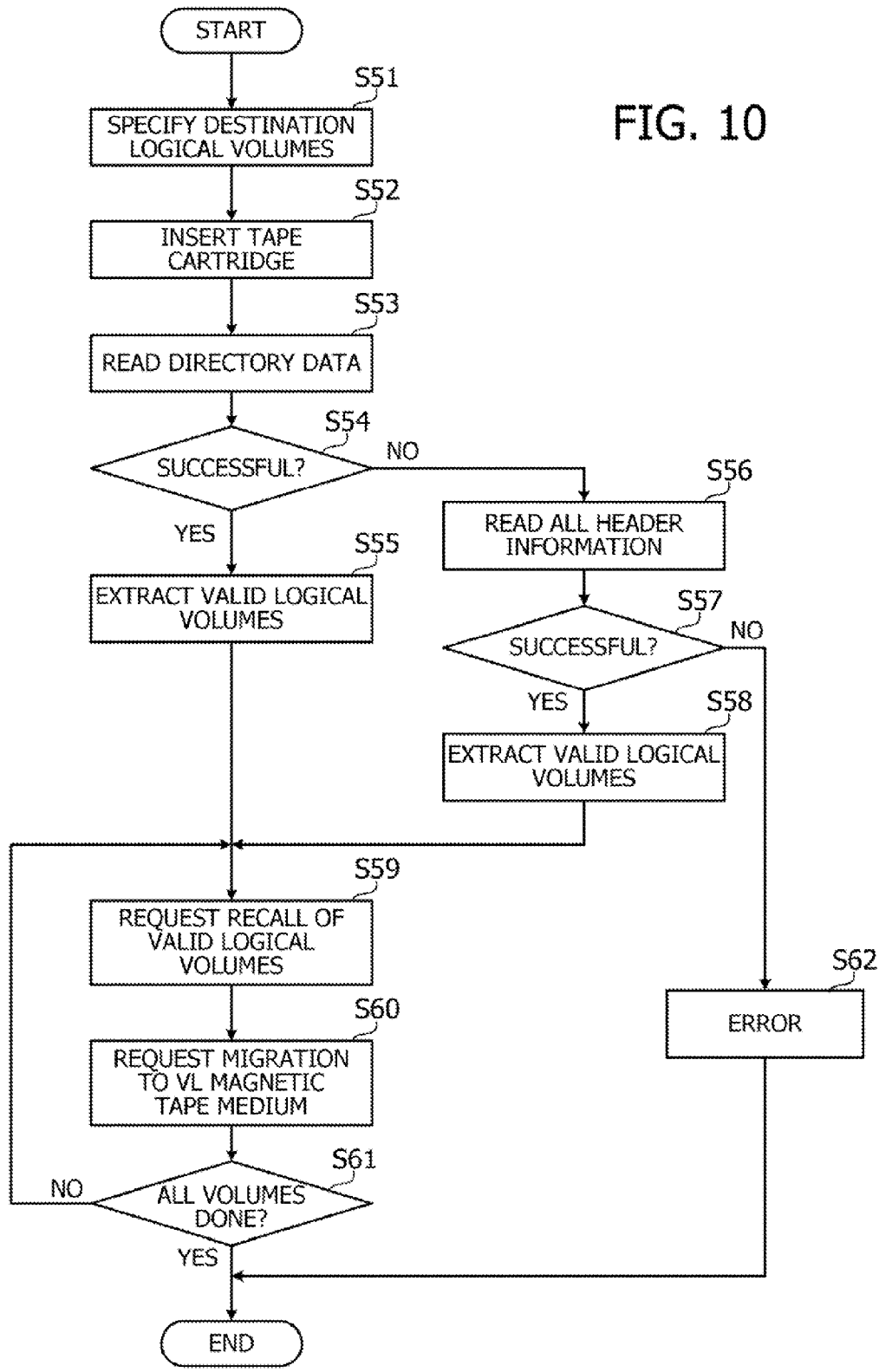
FIG. 10 is a flowchart of a process executed when import processing is requested.

FIG. 10 is a flowchart of a process executed when import processing is requested. The process illustrated in FIG. 10 is executed in response to an import request from the host device 600 to the VL control processor 100. Here the requesting host device 600 is operated by, for example, an administrator of the virtual library system.

(Step S51) The import control unit 125 specifies a set of destination logical volumes to be imported from a magnetic tape medium. The import control unit 125 also creates entries for the specified logical volumes in the volume management table 131.

(Step S52) A tape cartridge is inserted to the tape library device 300 through its media port 305a, the cartridge containing an import magnetic tape medium.

(Step S53) The import control unit 125 requests the migration/recall control unit 126 to read directory data from an IC memory on the inserted tape cartridge. The migration/recall control unit 126 executes this request at the highest priority. More specifically, the tape library device 300 mounts the inserted tape cartridge on either of the two tape drives 303a and 303b, under the control of the migration/recall control unit 126. The tape library device 300 then reads out directory data from an IC memory on the mounted tape cartridge and sends it to the migration/recall control unit 126. The tape library device 300 may notify the migration/recall control unit 126 of read error if it is unable to read the directory data correctly. The migration/recall control unit 126 then supplies the import control unit 125 with the directory data or an error notice.

(Step S54) When the directory data is successfully read out of the IC memory, S55 is to be executed. When it is unsuccessful, S56 is to be executed.

(Step S55) Based on the supplied directory data, the import control unit 125 extracts valid logical volumes out of those recorded in the inserted magnetic tape medium. For example, the directory data includes logical volume ID, storage address on the magnetic tape medium, time stamp of last-saved date and time, and other information on each recorded logical volume. When two or more logical volumes sharing the same ID are found in the supplied directory data, the import control unit 125 qualifies one of those logical volumes that has the latest time stamp as being valid, while disregarding the others as being obsolete. As an alternative method, the directory data may be configured to provide flags corresponding to logical volume IDs to indicate whether the volume is valid or not. In this case, the flags should be managed in an appropriate manner to grant the validity exclusively for the latest one of those logical volumes with the same ID. When a valid set of logical volumes is extracted, S59 is to be executed.

(Step S56) S56 is reached as a result of unsuccessful read-out of directory data at S53 because of, for example, a failure in the IC memory on the tape cartridge. The magnetic tape medium in the tape cartridge, however, stores similar information in the header of data records. Accordingly, the import control unit 125 may use this header information read out of the magnetic tape medium to extract valid logical volumes from the same, although it takes a longer time compared with the case where the IC memory data can be used.

The import control unit 125 requests the migration/recall control unit 126 to read all header information added to the data records on the magnetic tape medium in the inserted tape cartridge. The migration/recall control unit 126 executes this request at the highest priority. Under the control of the migration/recall control unit 126, the tape library device 300 reads out a series of data records from the magnetic tape medium in the tape cartridge mounted at S53. During this course, the tape library device 300 extracts header information and sends it to the migration/recall control unit 126. Here the tape library device 300 may notify the migration/recall control unit 126 of read error if it is unable to read the header information correctly. The migration/recall control unit 126 then supplies the import control unit 125 with the header information or an error notice.

(Step S57) When the header information is successfully read out of the magnetic tape medium, S58 is to be executed. When it is unsuccessful, S62 is to be executed.

(Step S58) Based on the supplied header information, the import control unit 125 extracts valid logical volumes out of those recorded in the inserted magnetic tape medium. For example, the header information includes logical volume ID, time stamp, and other information on each recorded logical volume. When two or more log volumes sharing the same ID are found in the supplied header information, the import control unit 125 qualifies one of those logical volumes that has the latest time stamp as being valid, while disregarding the others as being obsolete. The import control unit 125 then proceeds to S59.

(Step S59) The import control unit 125 requests the migration/recall control unit 126 to execute a recall operation to copy the qualified logical volumes from the magnetic tape medium to the disk array device 200. The migration/recall control unit 126 executes this request at the highest priority and notifies the import control unit 125 of completion of the requested processing. In response to the completion notification, the import control unit 125 gives a "Dirty" data status to the corresponding logical volumes in the volume management table 131.

(Step S60) The import control unit 125 requests the migration/recall control unit 126 to execute migration from the disk array device 200 to VL magnetic tape media, with respect to the logical volumes that have been copied to the disk array device 200 as a result of the recall operation requested at S59. The migration/recall control unit 126 executes this request at the highest priority and notifies the import control unit 125 of completion of the requested processing. In response to the completion notification, the import control unit 125 gives a "Hit" data status to the corresponding logical volumes in the volume management table 131.

(Step S61) The import control unit 125 determines whether all the qualified logical volumes have been copied to VL magnetic tape media. When there are unfinished volumes, the import control unit 125 returns to S59 to subject the next logical volume to the above steps. When all volumes have been finished, the import control unit 125 terminates the present import process.

As the tape library device 300 of the present embodiment has a plurality of tape drives 303a and 303b, it is possible to use one tape drive to mount the inserted tape cartridge and another tape drive to mount a tape cartridge containing a VL magnetic tape medium specified as the destination of copied data at S60. When this is the case, the migration/recall control unit 126 may execute a recall operation of S59 and a migration operation of S60 simultaneously.

It is also noted that the processing at S59 and S60 may be applied to two or more qualified logical volumes in a parallel fashion, rather than handling them one by one. When this is the case, S59 may copy all qualified logical volumes to the disk array device 200, before they are subjected to migration to the VL magnetic tape media. Accordingly, the migration operation of S60 may be executed with a lower priority.

(Step S62) The import control unit 125 recognizes the occurrence of an error in the present import process, thus notifying the host device 600 of that fact, for example.

According to the above processing steps of FIG. 10, the latest logical volumes are read out of the inserted magnetic tape medium and loaded into the disk array device 200 even if the magnetic tape medium contains some different versions of logical volumes with the same ID. This feature prevents the virtual library system from being loaded with obsolete logical volumes, and thus avoids wasting storage space.

As noted earlier, the foregoing virtual library system is configured to initiate a copy operation of a logical volume from the disk array device 200 to an export magnetic tape medium, when that logical volume in the disk array device 200 is copied to a VL magnetic tape medium. The task of copying logical volumes to the export magnetic tape medium may thus affect the performance of the virtual library system in operation. To solve this problem, such migration operations to the export magnetic tape medium are given a lower priority than recall operations requested by the cache control unit 121, export control unit 124, or import control unit 125, as described earlier. In addition, the present embodiment accelerates recall processing by reading logical volumes, not only from VL magnetic tape media, but also from export magnetic tape media (if possible), as will be described below with reference to FIG. 11.

Figure 11:
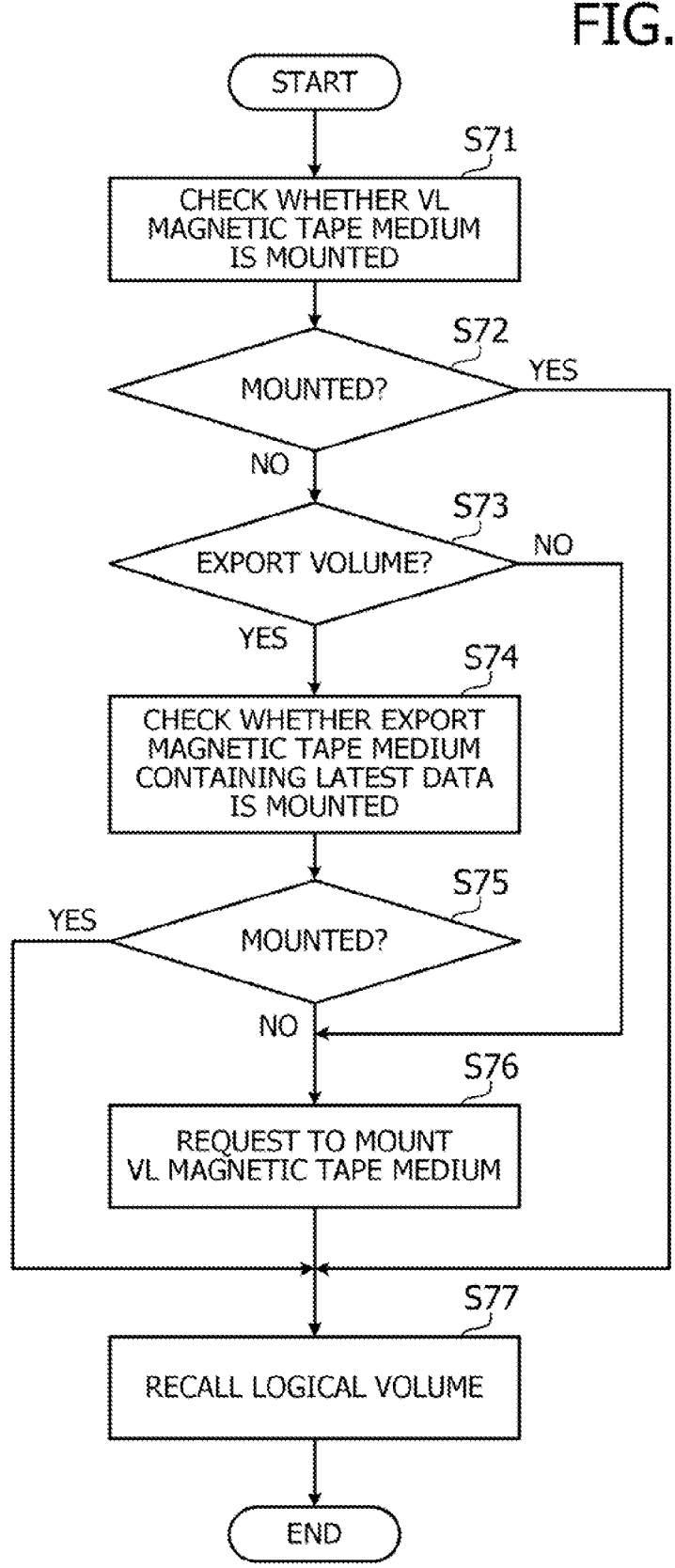
FIG. 11 is a flowchart of a process executed when recall processing is requested.

FIG. 11 is a flowchart of a process executed when recall processing is requested. The process illustrated in FIG. 11 is executed when, for example, a recall request is received from the cache control unit 121. More specifically, the cache control unit 121 may receive a data read request from the host device 600, for example. The cache control unit 121 then consults the volume management table 131 to check whether the logical volume containing requested data has a data status of "Miss" and, if so, requests the migration/recall control unit 126 to execute a recall operation for that missing logical volume (referred to herein as the "requested logical volume").

(Step S71) The migration/recall control unit 126 sends a query to the tape library device 300 to obtain the physical volume IDs of magnetic tape media currently mounted on the tape drives. With the obtained information, the migration/recall control unit 126 determines whether a VL magnetic tape medium containing the requested logical volume is mounted on a tape drive.

(Step S72) When a relevant VL magnetic tape medium is mounted, S77 is to be executed. When no such VL magnetic tape medium is mounted, S73 is to be executed.

(Step S73) With reference to the export status field of the volume management table 131, the migration/recall control unit 126 determines whether the requested logical volume is an export logical volume. If it is an export logical volume, S74 is to be executed. If it is not, S76 is to be executed.

(Step S74) By controlling the tape library device 300, the migration/recall control unit 126 reads out directory data from IC memory on the tape cartridge mounted on each tape drive. The migration/recall control unit 126 then determines whether the export magnetic tape medium containing the latest version of the requested logical volume is mounted on a tape drive.

For example, the migration/recall control unit 126 consults the volume management table 131 to check the export status of the requested logical volume. If the export status indicates "Saved," and if the currently mounted export magnetic tape medium contains the requested logical volume, then the migration/recall control unit 126 determines that the export magnetic tape medium containing the latest version of the requested logical volume is mounted.

For the purpose of more accurate determination, the export operation may be configured to record time stamps of export logical volumes, together with logical volume IDs, not only in IC memory on a tape cartridge, but also in the volume management table 131, to indicate when the corresponding logical volumes were saved in an export magnetic tape medium. In this case, those time stamps in the volume management table 131 have only to record the last saved date and time of each logical volume in the export magnetic tape medium. Then the migration/recall control unit 126 determines in this S74 that the export magnetic tape medium containing the latest version of the requested logical volume is mounted, if the time stamp recorded in the volume management table 131 matches with the time stamp read out of the IC memory on the mounted tape cartridge.

As yet another variation, the volume management table 131 and IC memory on a tape cartridge may be used to record the version information of saved logical volumes, instead of the time stamps discussed above. In most cases, such version information takes up less data space than the time stamps indicating last-saved date and time.

(Step S75) When it is determined that the export magnetic tape medium containing the latest version of the requested logical volume is mounted, S77 is to be executed. If not, S76 is to be executed.

(Step S76) The migration/recall control unit 126 requests the tape library device 300 to mount a VL magnetic tape medium containing the requested logical volume. The tape library device 300 transports the tape cartridge containing the requested VL magnetic tape medium from the media storage unit 304 to a tape drive and mounts it thereon.

(Step S77) The migration/recall control unit 126 recalls the requested logical volume by causing the tape library device 300 to transfer the relevant data from the mounted magnetic tape medium to the disk array device 200. In the case where this S77 is reached from S72 or S76, the requested logical volume is read out of the mounted VL magnetic tape medium and sent to the disk array device 200. In the case where this S77 is reached from S75, the requested logical volume is read out of the mounted export magnetic tape medium and sent to the disk array device 200.

According to the above processing steps of FIG. 11, a requested logical volume is read out of an export magnetic tape medium in response to a recall request, if that medium is ready in a tape drive at the time of request, while no relevant VL magnetic tape medium is mounted on a tape drive. This feature reduces the time required for recall processing because the requested logical volume can be immediately read out of the export magnetic tape medium without the need for transporting a VL magnetic tape medium.

(c) Third Embodiment

In the event of a failure in the export magnetic tape medium, or in the tape cartridge containing that medium, the foregoing second embodiment has to load a new export magnetic tape medium and save the export logical volumes again. Such failures may be, for example, a damage to magnetic tape, or a defect of IC memory that makes memory access impossible. In contrast, the third embodiment employs redundancy in its export magnetic tape media in order to deal with such failure in a magnetic tape medium or tape cartridge, thus executing an export operation as quickly as possible.

Figure 12:
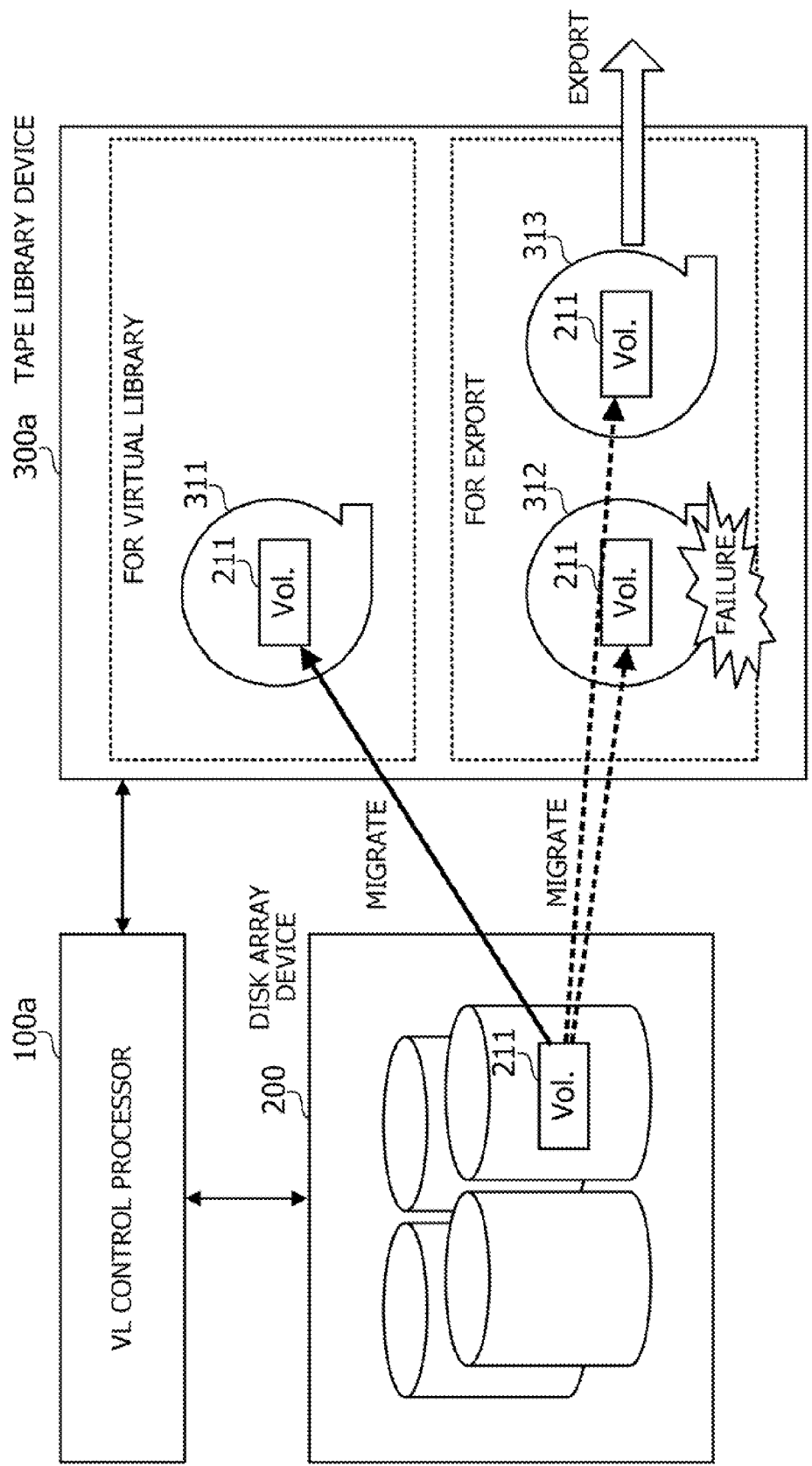
FIG. 12 illustrates a process of storing data in a magnetic tape medium in a storage system according to a third embodiment.

FIG. 12 illustrates an operation of storing data in a magnetic tape medium in a storage system according to the third embodiment. The third embodiment offers a storage system with the same basic structure as the second embodiment. The VL control processor 100a and tape library device 300a illustrated in FIG. 12 are similar to the foregoing VL control processor 100 and tape library device 300 of the second embodiment. It is assumed that the VL control processor 100a of the third embodiment is formed from the same functional blocks of the VL control processor 100 discussed in the second embodiment.

The VL control processor 100a copies logical volumes on the disk array device 200 to a VL magnetic tape medium in the same way as in the second embodiment. While logical volumes in the disk array device 200 are also copied to an export magnetic tape medium basically in the same way as in the second embodiment, the VL control processor 100a of the third embodiment always makes at least two copies in separate export magnetic tape media. Accordingly, it is preferable that the tape library device 300a is equipped with three or more tape drives so as to record data in at least one VL magnetic tape medium and at least two export magnetic tape medium simultaneously.

Referring to FIG. 12, the VL control processor 100a manipulates the disk array device 200 and tape library device 300a to copy a logical volume 211 on the disk array device 200 to a VL magnetic tape medium 311. This operation is similar to what the migration/recall control unit 126 performs in response to a request at S13 of FIG. 8. Then the VL control processor 100a consults the volume management table 131 to determine whether the logical volume 211 is an export logical volume. If it is, the VL control processor 100a invokes a copying operation for the logical volume 211 to export magnetic tape media 312 and 313. This operation is similar to what the migration/recall control unit 126 performs in response to a request at S19 of FIG. 8.

Afterwards, the VL control processor 100a receives an export request from a host device 600 (not illustrated). In the event that, for example, one export magnetic tape medium 312 encounters a failure, the VL control processor 100a then requests the tape library device 300a to eject the other export magnetic tape medium 313, thereby ejecting an export magnetic tape medium without delay. On the other hand, in the case where both export magnetic tape medium 312 and 313 maintain their data integrity, the VL control processor 100a requests the tape library device 300a to eject one of the two export magnetic tape media 312 and 313 that has previously been determined. The VL control processor 100a treats the remaining export magnetic tape medium as an empty medium for the future export operation.

Figure 13:
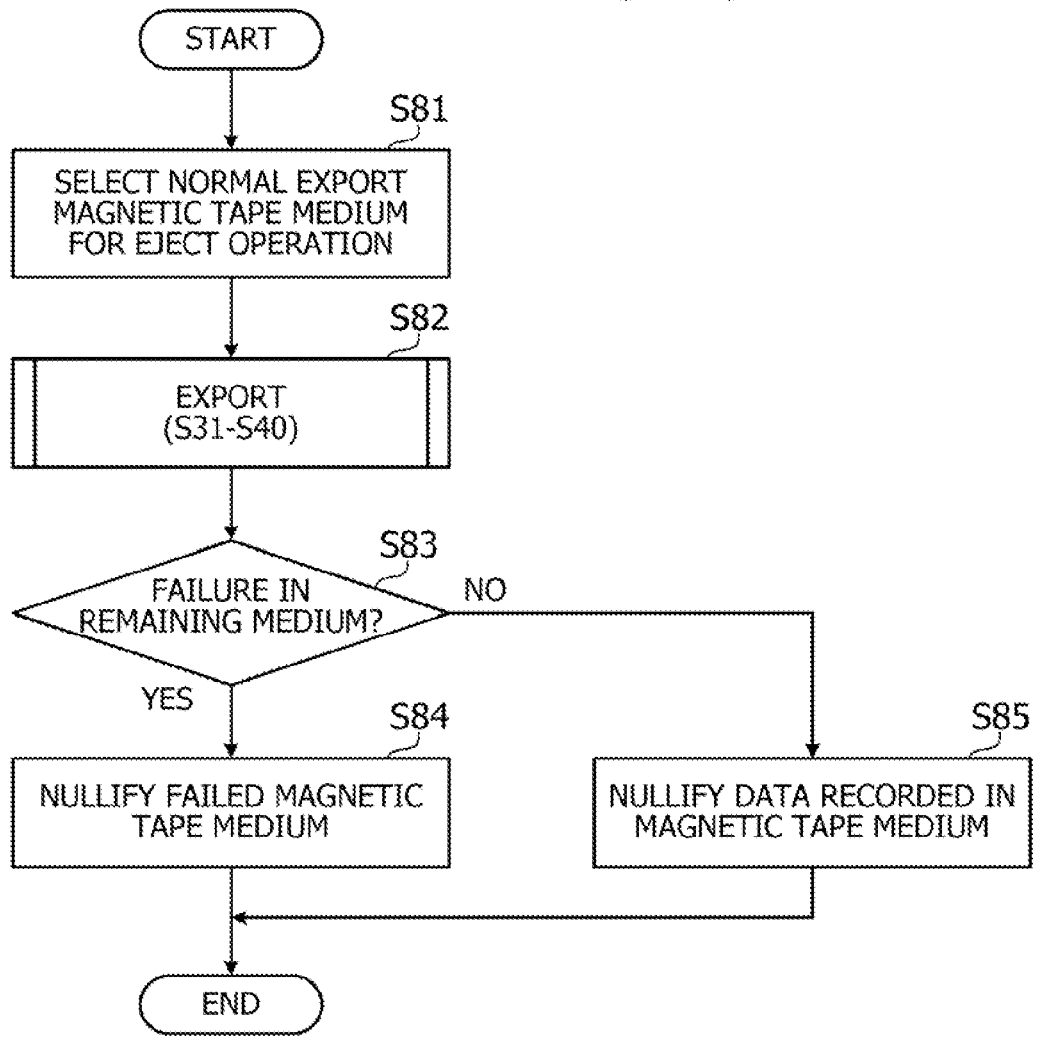
FIG. 13 is a flowchart of a process executed when export processing is requested.

FIG. 13 is a flowchart of a process executed when export processing is requested.

(Step S81) In response to an export request from the host device 600, the export control unit 124 determines whether the export magnetic tape media mounted on tape drives, or their respective tape cartridges, have any problems. The export control unit 124 chooses one of the normal export magnetic tape media for later eject operation. More specifically, the export control unit 124 requests the migration/recall control unit 126 to read out some data from the mounted export magnetic tape media, as well as from IC memory on those tape cartridges. The export control unit 124 sees whether the data can successfully be read out of the media or memory, thereby detecting failure, if any, in the export magnetic tape media.

(Step S82) Similarly to the S31 to S40 discussed in FIG. 9, the VL control processor 100a causes the tape library device 300a to eject the export magnetic tape medium selected at S81.

(Step S83) The result of the failure check at S81 indicates the presence or absence of a failure in the remaining export magnetic tape medium. In the former case, S84 is to be executed. In the latter case, S85 is to be executed.

(Step S84) The export control unit 124 nullifies the failed export magnetic tape medium to prevent it from being used in later processing. For example, the export control unit 124 manipulates the migration/recall control unit 126 such that the failed export magnetic tape medium will be stored back to the media storage unit 304. More specifically, the export control unit 124 places a record of physical volume ID of the failed export magnetic tape medium in a local memory 302 of the tape library device 300a, the record disabling future use of the export magnetic tape medium. As an alternative method, the export control unit 124 may command the tape library device 300 to eject the failed export magnetic tape medium.

(Step S85) The export control unit 124 nullifies data recorded in the remaining export magnetic tape medium. For example, the export control unit 124 may request the migration/recall control unit 126 to make access to IC memory on the tape cartridge enclosing the remaining export magnetic tape medium to initialize the directory data stored therein. The migration/recall control unit 126 may also rewind the tape to the top position.

According to the above processing steps of FIG. 13, the tape library device is ready to eject an alternative export magnetic tape medium in case of failure of one export magnetic tape medium. When those export magnetic tape media have no failures, the remaining export magnetic tape medium can be reused later, without sacrificing the efficiency of usage of tape media.

(d) Fourth Embodiment

Compared with the third embodiment discussed above, the present embodiment provides a different countermeasure against possible failure in export magnetic tape media or tape cartridges enclosing the same. More specifically, the present embodiment is configured to copy export logical volumes and non-export logical volumes on the disk array device to separate VL magnetic tape media. Further, at least the export logical volumes are duplicated on at least two VL magnetic tape media, thus providing a redundant set of logical volumes.

The present embodiment, on the other hand, uses only one magnetic tape medium for export purposes. If a failure is found in the export magnetic tape medium or its tape cartridge when an export request is received, the present embodiment ejects one of the VL magnetic tape media containing the export logical volumes in place of the original export magnetic tape medium.

Figure 14:
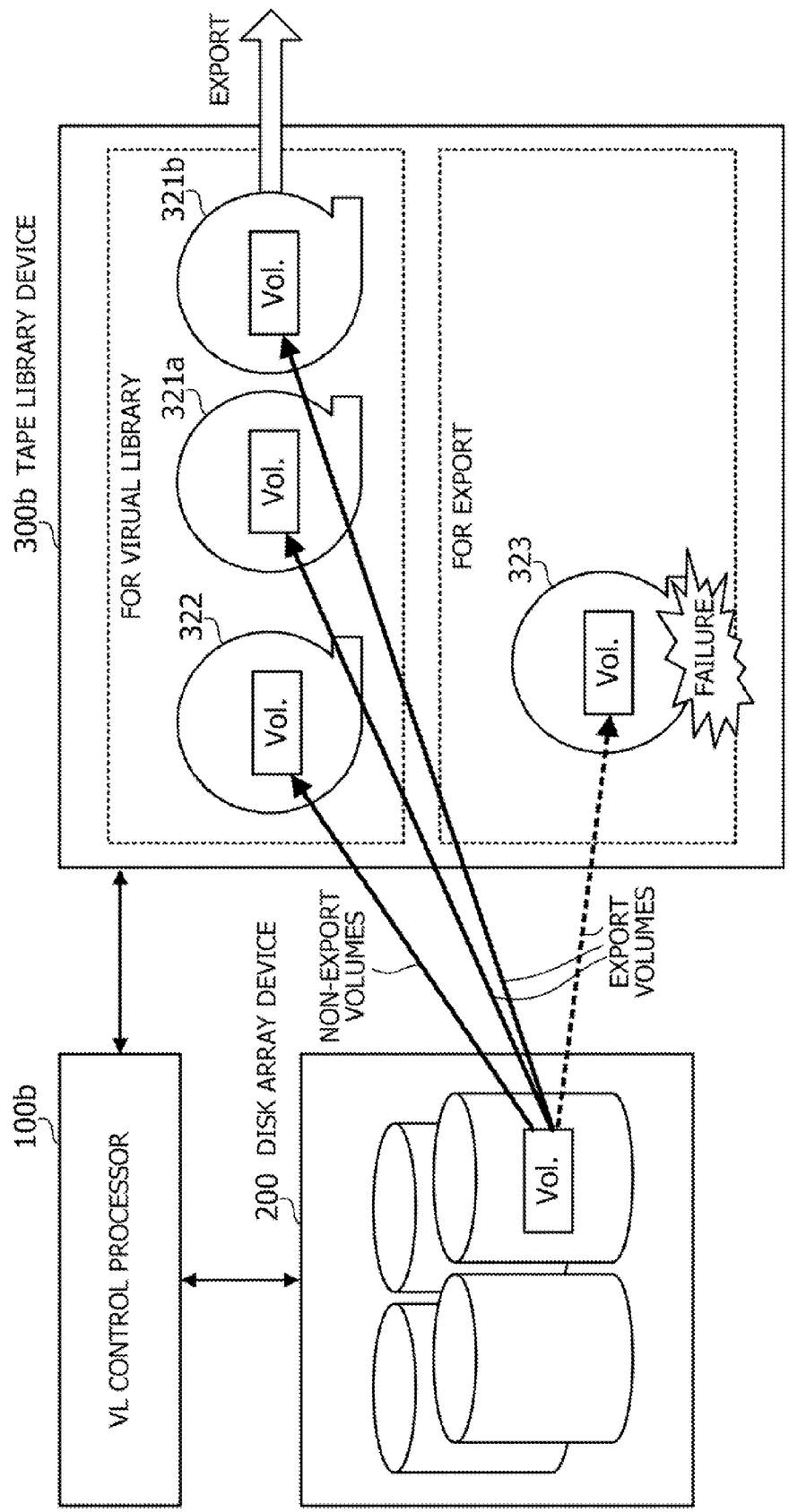
FIG. 14 illustrates a process of storing data in a magnetic tape medium in a storage system according to a fourth embodiment.

FIG. 14 illustrates a process of storing data in a magnetic tape medium in a storage system according to the fourth embodiment. The fourth embodiment offers a storage system with the same basic structure as the second embodiment. The VL control processor 100b and tape library device 300b illustrated in FIG. 14 are similar to the foregoing VL control processor 100 and tape library device 300 of the second embodiment. It is assumed that the VL control processor 100b of the fourth embodiment is formed from the same functional blocks of the VL control processor 100 discussed in the second embodiment.

The tape library device 300b has three tape drives, on which VL magnetic tape media 321a, 321b, and 322 are mounted, respectively. The first and second VL magnetic tape media 321a and 321b are used to store copies of export logical volumes, whereas the third VL magnetic tape medium 322 is used to store a copy of non-export logical volumes. The same data will be written in the first VL magnetic tape medium 321a and second VL magnetic tape medium 321b.

As mentioned above, the third VL magnetic tape medium 322 stores a copy of non-export logical volumes. The present embodiment may be modified to write those non-export logical volumes in two VL magnetic tape media similarly to the export logical volumes.

Another tape drive accommodates an export magnetic tape medium 323. The export logical volumes are copied to this export magnetic tape medium 323 after they are copied to the first and second VL magnetic tape media 321a and 321b.

Afterwards, the VL control processor 100b receives an export request from a host device 600 (not illustrated). The export magnetic tape medium 323 is ejected from the tape library device 300 when it has no problems. However, a failure may be found in the export magnetic tape medium 323 when the export request is received. In that case, either of the first and second VL magnetic tape media 321a and 321b is ejected from the tape library device 300b. FIG. 14 depicts an example where the second VL magnetic tape medium 321b is ejected instead of the failed export magnetic tape medium 323.

Figure 15:
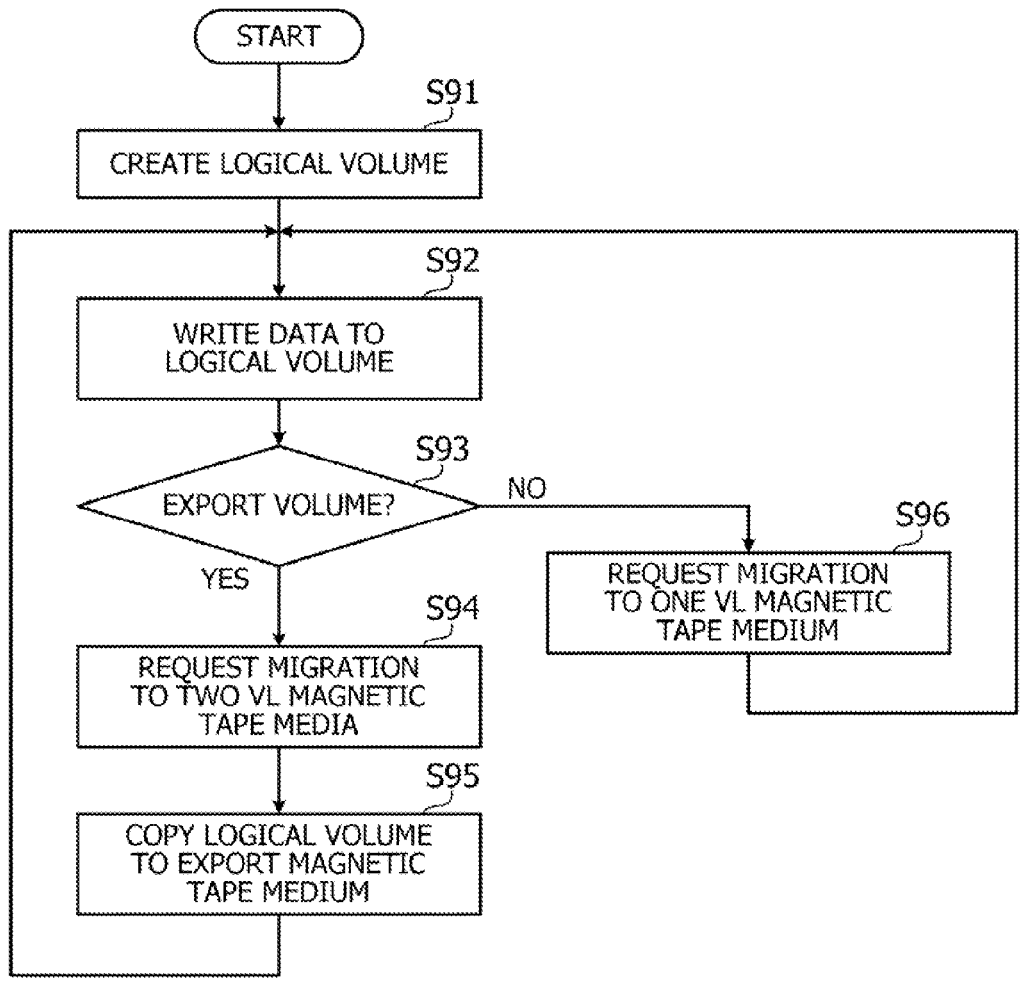
FIG. 15 is a flowchart illustrating a process of writing data in a logical volume.

FIG. 15 is a flowchart illustrating a process of writing data in a logical volume. The process illustrated in FIG. 15 assumes that the data write operation acts on a single logical volume.

(Step S91) The cache control unit 121 creates a new logical volume in the disk array device 200 in response to, for example, a request from the host device 600, similarly to S11 of FIG. 8. This S91 may also execute an attribute changing operation to change an existing non-export logical volume to an export logical volume in response to a request from the host device 600, in the way described in S11.

(Step S92) S92 is similar to S12 of FIG. 8. That is, upon receipt of a data write request from the host device 600, the cache control unit 121 controls the disk array device 200 so as to write the data supplied from the host device 600 in the logical volume that is created or subjected to an attribute changing operation at S91.

(Step S93) The cache control unit 121 requests the VL data storage control unit 122 to copy the logical volume that has gained new data at S92, to a VL magnetic tape medium in the tape library device 300b. In response to the request, the VL data storage control unit 122 determines whether the specified logical volume is an export logical volume, based on the export status in the volume management table 131. When the logical volume in question is an export logical volume, S94 is to be executed. If it is not, S96 is to be executed.

(Step S94) The VL data storage control unit 122 requests the migration/recall control unit 126 to copy the logical volume on the disk array device 200 to two VL magnetic tape media 321a and 321b assigned for export logical volumes.

(Step S95) After the logical volume is copied to the first and second VL magnetic tape media 321a and 321b, the VL data storage control unit 122 requests the migration/recall control unit 126 to copy the same to the export magnetic tape medium 323. These operations are similar to S15 to S19 discussed in FIG. 8, except that there are two destination VL magnetic tape media. The process of FIG. 15 then returns to S92, thus allowing the cache control unit 121 to wait for a new data write operation to logical volumes.

(Step S96) The VL data storage control unit 122 requests the migration/recall control unit 126 to copy the logical volume on the disk array device 200 to the third VL magnetic tape medium 322 assigned for non-export logical volumes. The process of FIG. 15 then returns to S92, thus allowing the cache control unit 121 to wait for a new data write operation to logical volumes.

Figure 16:
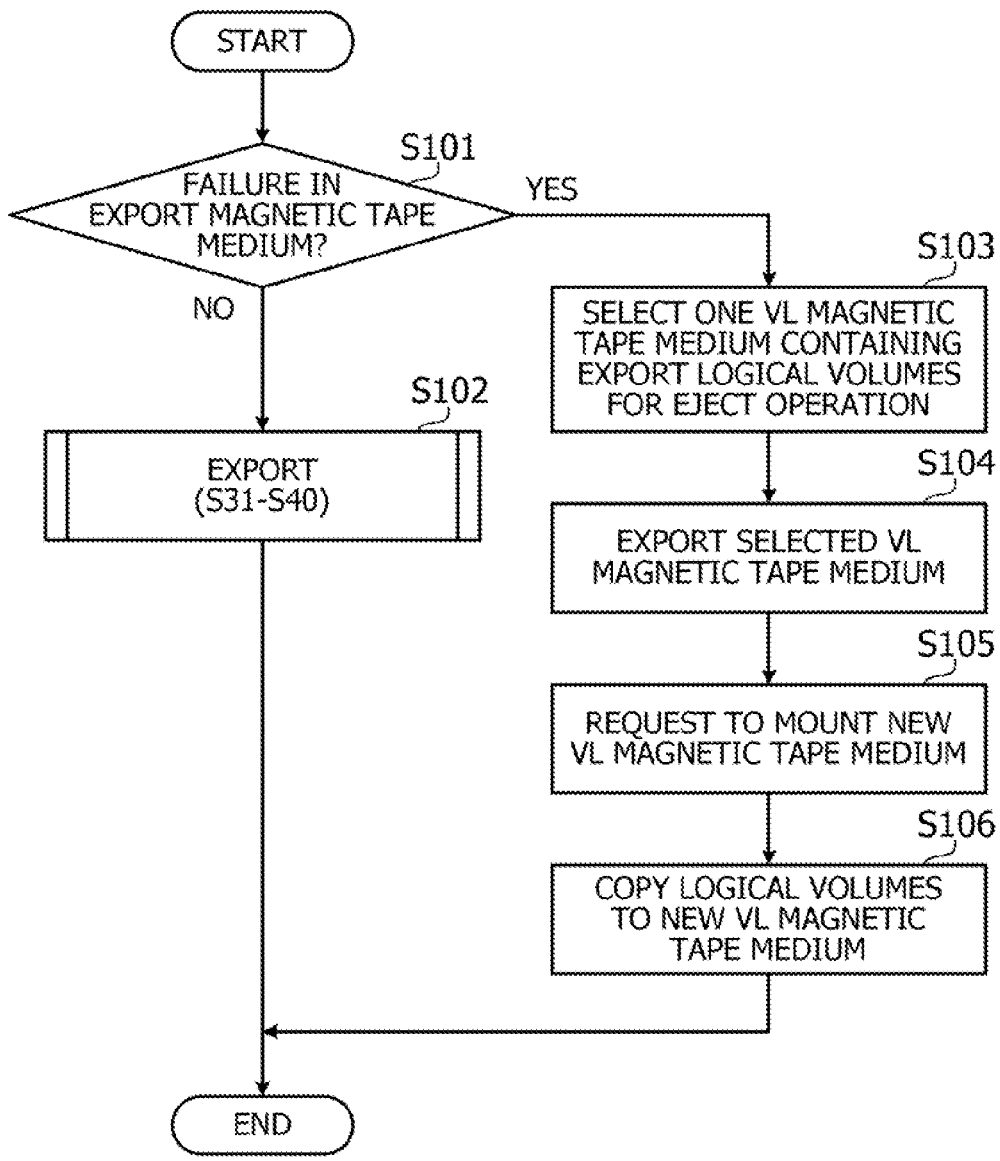
FIG. 16 is a flowchart of a process executed when export processing is requested.
Figure 17:
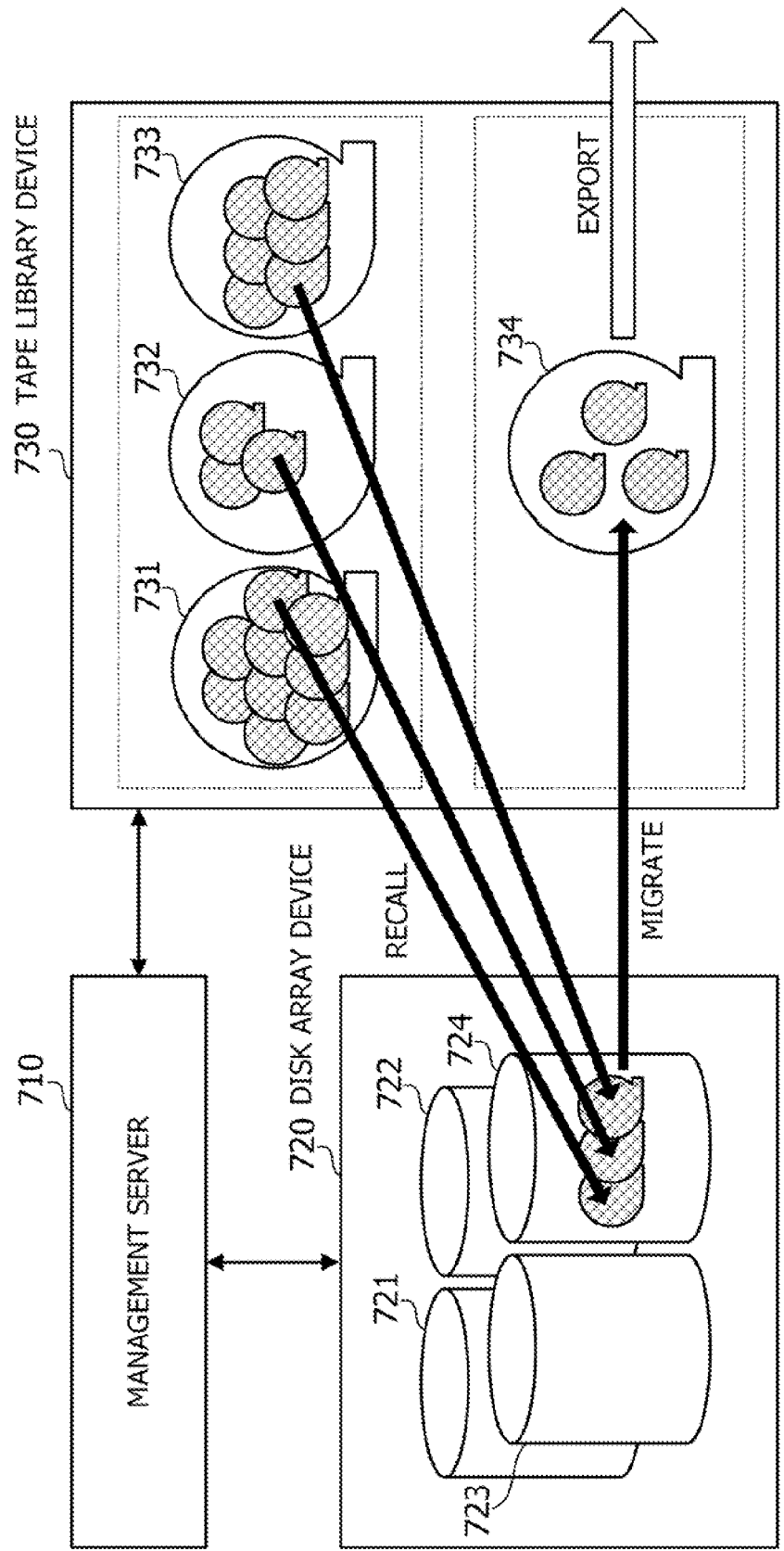
FIG. 17 illustrates an export operation performed in a virtual library system.

FIG. 16 is a flowchart of a process executed when export processing is requested.

(Step S101) In response to an export request from the host device 600, the export control unit 124 checks whether the export magnetic tape medium 323 mounted on a tape drive, or its tape cartridge, have any problems. When the export magnetic tape medium 323 has no problems, S102 is to be executed. When any problem is found, S103 is to be executed.

(Step S102) Similarly to the S31 to S40 discussed in FIG. 9, the VL control processor 100b causes the tape library device 300b to eject the export magnetic tape medium 323.

(Step S103) The export control unit 124 selects one of the first and second VL magnetic tape media 321a and 321b containing a copy of export logical volumes for a subsequent ejection operation. For example, the export control unit 124 selects the second VL magnetic tape medium 321b.

(Step S104) The VL control processor 100b causes the tape library device 300b to eject the second export magnetic tape medium 321b selected at S103. This operation is similar to S31 to S40 discussed in FIG. 9, except that the second VL magnetic tape medium 321b is to be ejected.

(Step S105) The export control unit 124 requests the migration/recall control unit 126 to mount a new VL magnetic tape medium on the tape drive from which the second VL magnetic tape medium 321b has been unmounted at S104.

(Step S106) The export control unit 124 requests the migration/recall control unit 126 to copy the logical volumes recorded in the first VL magnetic tape medium 321a to the newly mounted VL magnetic tape medium.

In response to the requests issued at S105 and S106, the migration/recall control unit 126 manipulates the tape library device 300b so as to mount a new VL magnetic tape medium on the specified tape drive, and then to copy the export logical volumes recorded in the first VL magnetic tape medium 321a to the new VL magnetic tape medium.

For improved reliability of logical volumes, it is preferable to give the highest priority to the actions of mounting a new VL magnetic tape medium and copying logical volumes to the mounted VL magnetic tape medium, so that they can be executed immediately. Data transfer between VL magnetic tape media may be executed locally within the tape library device 300b, without intervention of the disk array device 200. This alleviates the slowdown of normal data read and write operations requested by the host device 600.

According to the above processing steps of FIGS. 15 and 16, a VL magnetic tape medium takes over the role of an export magnetic tape medium when the latter medium encounters a failure. It is therefore possible to immediately eject a magnetic tape medium containing export logical volumes.

The functions of each device constituting the storage system according to the above embodiments may be implemented, wholly or partly, on a computer. In that case, the above-described functions of the system are encoded and provided in the form of computer programs. A computer system executes those programs, thereby providing the above-described processing functions. The programs may be stored in a computer-readable medium. Such computer-readable media include magnetic storage devices, optical discs, magneto-optical storage media, semiconductor memory devices, and other non-transitory storage media.

For the purpose of distributing computer programs, an optical disc or other portable storage medium containing the programs is made available for sale. Network-based distribution of software programs may also be possible, in which case program files are stored in a storage device of a server computer for downloading to other computers via a network.

A computer installs programs in its local storage device, from a portable storage medium or a server computer, so that they can be executed. The computer executes the installed programs while reading them out of its local storage device, thereby performing the programmed functions. Where appropriate, the computer may execute programs immediately from a portable storage medium, without installation. Another alternative method is that the computer executes programs as they are downloaded from a server computer.

The above sections have described various embodiments of a storage control apparatus and a storage control method. Advantageously, the proposed storage control apparatus and storage control method make it possible to eject a portable storage medium containing a copy of logical volumes in a short time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage control apparatus for controlling operation of a hierarchical storage system which uses portable storage media in a library device as secondary storage, the storage control apparatus comprising:

a first duplication control unit that causes a logical volume in a primary storage medium to be copied to a secondary storage medium, the primary storage medium serving as primary storage in the hierarchical storage system, the secondary storage medium being one of the portable storage media in the library device and serving as the secondary storage;

a second duplication control unit that causes the logical volume to be also copied from the primary storage medium to an export storage medium, in connection with the copying of the logical volume from the primary storage medium to the secondary storage medium by the first duplication control unit, when export attributes indicate that the logical volume copied by the first duplication control unit is supposed to be exported, the export storage medium being one of the portable storage media in the library device which is assigned for export operation; and a medium ejection control unit that causes the library device to eject the export storage medium, in response to an ejection request therefor.

2. The storage control apparatus according to claim 1, further comprising a data read control unit that causes a specified logical volume to be copied from the secondary storage medium back to the primary storage medium in response to a read request from a requesting device for data in the specified logical volume which is absent in the primary storage medium, and causes the requested data to be read out of the specified logical volume now in the primary storage medium and sent to the requesting device, wherein the data read control unit determines whether the export storage medium containing the specified logical volume is mounted on one of media drive units in the library device, when the secondary storage medium containing the specified logical volume is not mounted on any of the media drive units, and causes the specified logical volume to be copied from the export storage medium back to the primary storage medium when it is determined that the export storage medium containing the specified logical volume is mounted.

3. The storage control apparatus according to claim 1, further comprising a logical volume import control unit that causes logical volumes in a portable storage medium newly loaded into the library device to be copied to the primary storage medium, wherein the logical volume import control unit requests to selectively copy a latest record of a logical volume recorded in the newly loaded portable storage medium to the primary storage medium, when a plurality of records of logical volumes with the same volume identifier are contained in the newly loaded portable storage medium.

4. The storage control apparatus according to claim 3, wherein the logical volume import control unit causes the logical volumes copied from the newly loaded portable storage medium to the primary storage medium, to be copied further to the secondary storage medium.

5. The storage control apparatus according to claim 3, wherein the media drive units in the library device append a logical volume to the export storage medium when copying of that logical volume is requested by the second duplication control unit.

6. The storage control apparatus according to claim 1, wherein:
   the second duplication control unit causes the logical volume to be copied to a plurality of export storage media, the logical volume having been subjected to the first duplication control unit; and
   the medium ejection control unit causes, in response to the ejection request, one of the export storage media that maintains data integrity to be ejected out of the library device, while enabling the second duplication control unit to use the other export storage media maintaining data integrity as vacant storage medium for copying logical volumes.

7. The storage control apparatus according to claim 1, wherein:
   the export attributes of logical volumes indicate whether each logical volume is either an export logical volume to be exported out of the hierarchical storage system or a non-export logical volume not to be exported out of the hierarchical storage system;
   based on the export attributes, the first duplication control unit causes the non-export logical volumes to be copied from the primary storage medium to a first secondary storage medium, as well as the export logical volumes to be copied from the first secondary storage medium to each of a plurality of second secondary storage media; and
   in response to the ejection request for the export storage medium, the medium ejection control unit causes the library device to eject one of the second secondary storage media, instead of the export storage medium experiencing a failure.

8. The storage control apparatus according to claim 1, further comprising a data read control unit that causes a specified logical volume to be copied from the secondary storage medium back to the primary storage medium in response to a read request from a requesting device for data in the specified logical volume which is absent in the primary storage medium, and causes the requested data to be read out of the specified logical volume now in the primary storage medium and sent to the requesting device,
   wherein the copying from the secondary storage medium to the primary storage medium under control of the data read control unit is executed with a higher priority over the copying from the primary storage medium to the export storage medium under control of the second duplication control unit.

9. The storage control apparatus according to claim 1, wherein the medium ejection control unit identifies logical volumes missing in the export storage media by consulting the export attributes in response to the ejection request and causes the missing logical volumes to be copied from the primary storage medium to the export storage medium with a higher priority over the copying caused by the first duplication control unit.

10. A storage control method for controlling operation of a hierarchical storage system which uses portable storage media in a library device as secondary storage, the storage control method comprising:
   first copying a logical volume in a primary storage medium to a secondary storage medium, the primary storage medium serving as primary storage in the hierarchical storage system, the secondary storage medium being one of the portable storage media in the library device and serving as the secondary storage;
   second copying the logical volume also from the primary storage medium to an export storage medium, in connection with the first copying of the logical volume from the primary storage medium to the secondary storage medium, when export attributes indicate that the logical volume copied to the secondary storage medium is supposed to be exported, the export storage medium being one of the portable storage media in the library device which is assigned for export operation; and
   ejecting the export storage medium out of the library device in response to an ejection request therefor.

* * * * *